US011904489B2

(12) United States Patent
Sugiyama et al.

(10) Patent No.: US 11,904,489 B2
(45) Date of Patent: Feb. 20, 2024

(54) CUTTING DEVICE

(71) Applicant: BROTHER KOGYO KABUSHIKI KAISHA, Nagoya (JP)

(72) Inventors: Kentaro Sugiyama, Gifu (JP); Yukitoshi Watanabe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 88 days.

(21) Appl. No.: 17/583,471

(22) Filed: Jan. 25, 2022

(65) Prior Publication Data

US 2022/0234234 A1 Jul. 28, 2022

(30) Foreign Application Priority Data

Jan. 26, 2021 (JP) ................................ 2021-009981

(51) Int. Cl.
*B26D 5/20* (2006.01)
*B26D 7/26* (2006.01)
*B26D 5/00* (2006.01)
*B26D 7/02* (2006.01)

(52) U.S. Cl.
CPC ............ *B26D 5/20* (2013.01); *B26D 7/2614* (2013.01); *B26D 7/025* (2013.01); *B26D 2005/002* (2013.01); *B26D 2007/2678* (2013.01)

(58) Field of Classification Search
CPC ... B26D 5/20; B26D 5/22; B26D 5/24; B26D 5/26; B26D 5/28; B26D 5/30-36; B26D 2005/002; B26D 7/22; B26D 7/26; B26D 7/2628; B26D 7/2642
See application file for complete search history.

(56) References Cited

U.S. PATENT DOCUMENTS

| | | | | |
|---|---|---|---|---|
| 9,283,687 | B2 * | 3/2016 | Yamanashi | B26D 5/005 |
| 9,302,404 | B2 * | 4/2016 | Matsushima | B26D 7/26 |
| 9,333,665 | B2 * | 5/2016 | Niizeki | B26D 7/2628 |
| 9,352,580 | B2 * | 5/2016 | Dashiell | B41J 11/0015 |
| 9,386,176 | B2 * | 7/2016 | Iida | H04N 1/00679 |

(Continued)

FOREIGN PATENT DOCUMENTS

| | | |
|---|---|---|
| JP | 2005246562 A | 9/2005 |
| JP | 2006110651 A | 4/2006 |

*Primary Examiner* — Adam J Eiseman
*Assistant Examiner* — Richard D Crosby, Jr.
(74) *Attorney, Agent, or Firm* — K&L Gates LLP

(57) ABSTRACT

A cutting device includes a placement member on which an object to be cut is placed and a mounting portion to which a cutting blade is mounted. The cutting device detects, in the course of the mounting portion moving, a pressure correspondence value corresponding to a pressure applied to the mounting portion, and a movement amount of the mounting portion, decides a cutting pressure correspondence value that is the pressure correspondence value corresponding to a cutting pressure, on the basis of the pressure correspondence value and the movement amount after the cutting blade has come into contact with the object to be cut, and acquires cutting data. The cutting device further applies in accordance with the acquired cutting data, the cutting pressure corresponding to the decided cutting pressure correspondence value to the mounting portion, and cuts the object to be cut, using the cutting blade mounted to the mounting portion.

12 Claims, 14 Drawing Sheets

(56) References Cited

U.S. PATENT DOCUMENTS

| | | | | |
|---|---|---|---|---|
| 9,827,687 | B2 * | 11/2017 | Kawaguchi | B26D 7/025 |
| 9,927,802 | B2 * | 3/2018 | Nagai | G06T 11/60 |
| 10,029,382 | B2 * | 7/2018 | Fujihara | B26D 7/26 |
| 10,071,492 | B2 * | 9/2018 | Abe | B26D 5/005 |
| 10,124,609 | B2 * | 11/2018 | Kikuchi | B26D 1/185 |
| 10,259,212 | B2 * | 4/2019 | Raemaekers | B26D 5/00 |
| 10,353,644 | B2 * | 7/2019 | Itai | G06F 3/1256 |
| 11,213,966 | B2 * | 1/2022 | Sugiyama | B26D 7/2628 |
| 11,298,850 | B2 * | 4/2022 | Sugiyama | B26D 5/00 |
| 11,389,983 | B2 * | 7/2022 | Sugiyama | B26D 5/00 |
| 2005/0186010 | A1 * | 8/2005 | Shibata | B26F 1/3813 400/621 |
| 2012/0247293 | A1 * | 10/2012 | Nagai | B26F 1/3806 83/76.3 |
| 2014/0000429 | A1 * | 1/2014 | Fujihara | B26D 5/00 83/76.6 |
| 2014/0182432 | A1 * | 7/2014 | Muto | B26D 5/005 83/76.7 |
| 2014/0260854 | A1 * | 9/2014 | Tokura | B26F 1/3813 83/76.1 |
| 2014/0293376 | A1 * | 10/2014 | Tokura | B26F 1/3813 358/498 |
| 2014/0352511 | A1 * | 12/2014 | Yamanashi | G05B 19/409 700/114 |
| 2014/0352559 | A1 * | 12/2014 | Matsushima | B26D 5/005 101/3.1 |
| 2016/0031109 | A1 * | 2/2016 | Abe | B26D 7/08 83/75.5 |
| 2019/0143551 | A1 * | 5/2019 | Yoshida | B26D 5/00 83/365 |
| 2021/0008747 | A1 * | 1/2021 | Sugiyama | B26D 7/28 |
| 2021/0162618 | A1 * | 6/2021 | Sugiyama | B26D 7/22 |
| 2021/0362520 | A1 * | 11/2021 | Sakaguchi | B41J 11/663 |

* cited by examiner

CUTTING DEVICE

CROSS-REFERENCE TO RELATED APPLICATION

This application claims priority to Japanese Patent Application No. 2021-009981, filed on Jan. 26, 2021, the content of which is hereby incorporated by reference.

BACKGROUND

The present disclosure relates to a cutting device capable of cutting an object to be cut.

A cutting device is known that cuts a pattern from an object to be cut by moving the sheet-shaped object to be cut and a cutting blade relative to each other, in accordance with cutting data. This cutting device is provided with a storage device that individually stores various setting conditions corresponding to a type indicating a hardness, a thickness, and the like of the object to be cut. The cutting device reads out the setting conditions depending on the type of the object to be cut from the above-mentioned storage device, and cuts the object to be cut on the basis of the read out setting conditions.

SUMMARY

However, in the above-described cutting device, when the setting conditions set on the basis of the type stored in the storage device do not correspond to the actual object to be cut, the cutting device cannot appropriately cut the object to be cut.

An object of the present disclosure is to provide a cutting device capable of cutting an object to be cut using conditions suited to the object to be cut.

A cutting device according to the present disclosure includes a placement member, a mounting portion, a first movement mechanism, a second movement mechanism, a pressure applying mechanism, a processor, and a memory. An object to be cut is placeable on the placement member. A cutting blade is mountable to the mounting portion. The first movement mechanism is configured to relatively move the object to be cut placed on the placement member, and the mounting portion in a first direction and a second direction. The second direction is opposite to the first direction. The second movement mechanism is configured to move the mounting portion in a third direction causing the mounting portion to move closer to the placement member, and a fourth direction causing the mounting portion to move away from the placement member. The third direction and the fourth direction intersects the first direction and the second direction. The pressure applying mechanism is configured to apply pressure to the mounting portion in the third direction, in accordance with a movement of the mounting portion by the second movement mechanism. The processor is configured to control the first movement mechanism and the second movement mechanism. The memory is configured to store computer-readable instructions that, when executed by the processor, instruct the processor to perform processes comprising moving the mounting portion, by controlling the first movement mechanism, to a facing position at which the cutting blade faces the object to be cut and the cutting blade is separated, in the fourth direction, from the object to be cut, and moving the mounting portion in the third direction from the facing position by controlling the second movement mechanism. The computer-readable instructions also instruct the processor to perform processes comprising detecting, in a course of the mounting portion moving in the third direction, a pressure correspondence value corresponding to the pressure in the third direction applied to the mounting portion by the pressure applying mechanism, and a movement amount of the mounting portion in the third direction, and deciding a cutting pressure correspondence value, on a basis of the pressure correspondence value and the movement amount after the cutting blade has come into contact with the object to be cut, of the detected pressure correspondence value and the detected movement amount, the cutting pressure correspondence value being the pressure correspondence value corresponding to a cutting pressure applied to the mounting portion by the pressure applying mechanism when cutting the object to be cut using the cutting blade. And the computer-readable instructions also instruct the processor to perform processes comprising acquiring cutting data for cutting a pattern from the object to be cut, controlling the first movement mechanism and the second movement mechanism in accordance with the acquired cutting data, applying the cutting pressure corresponding to the decided cutting pressure correspondence value to the mounting portion, using the pressure applying mechanism, and cutting the object to be cut, using the cutting blade mounted to the mounting portion.

According to the present disclosure, the cutting device decides the cutting pressure on the basis of the pressure applied to the mounting portion and the movement amount after the cutting blade has come into contact with the object to be cut. Thus, the cutting device can apply, to the mounting portion, the cutting pressure appropriate for the object to be cut, and as a result, the cutting device can appropriately cut the object to be cut, using the cutting blade mounted to the mounting portion.

BRIEF DESCRIPTION OF THE DRAWINGS

Embodiments of the disclosure will be described below in detail with reference to the accompanying drawings in which.

DETAILED DESCRIPTION OF EMBODIMENTS

Embodiments embodying a cutting device 1 according to the present disclosure will be described in order with reference to the drawings. The drawings to be referenced are used to illustrate the technical features that can be adopted in the present disclosure, and the described configurations and the like of the devices are not intended to be limited thereto, but are merely explanatory examples. The lower left side, the upper right side, the lower right side, the upper left side, the upper side, and the lower side in FIG. 1 correspond to the front side, the rear side, the right side, the left side, the upper side, and the lower side, respectively, of the cutting device 1.

Overview of Cutting Device 1

An overview of a cutting device 1 will be described with reference to FIG. 1 to FIG. 3. The cutting device 1 is used in a state fitted with a cartridge 4 including a cutting blade Cs, and the cutting device 1 can cut an object to be cut 20 using the cutting blade Cs. In the embodiment, an adhesive sheet obtained by laminating a sheet material 20A and a release paper 20B (refer to FIG. 7) is used as the object to be cut 20. An adhesive is applied to one side of the sheet material 20A. The release paper 20B is adhered to the one side of the sheet material 20A by the adhesive, and covers the entire region of the one side of the sheet material 20A. The release paper 20B is harder than the sheet material 20A. For example, a user peels the sheet material 20A of the object to be cut 20 that has been cut by the cutting device 1 from the release paper 20B, adheres the sheet material 20A to an adherend using the adhesive, and uses the adherend. Thus, in the cutting device 1, when cutting the object to be cut 20, it is desirable to cut only the sheet material 20A (perform a half cut), without cutting the release paper 20B.

Figure 1:
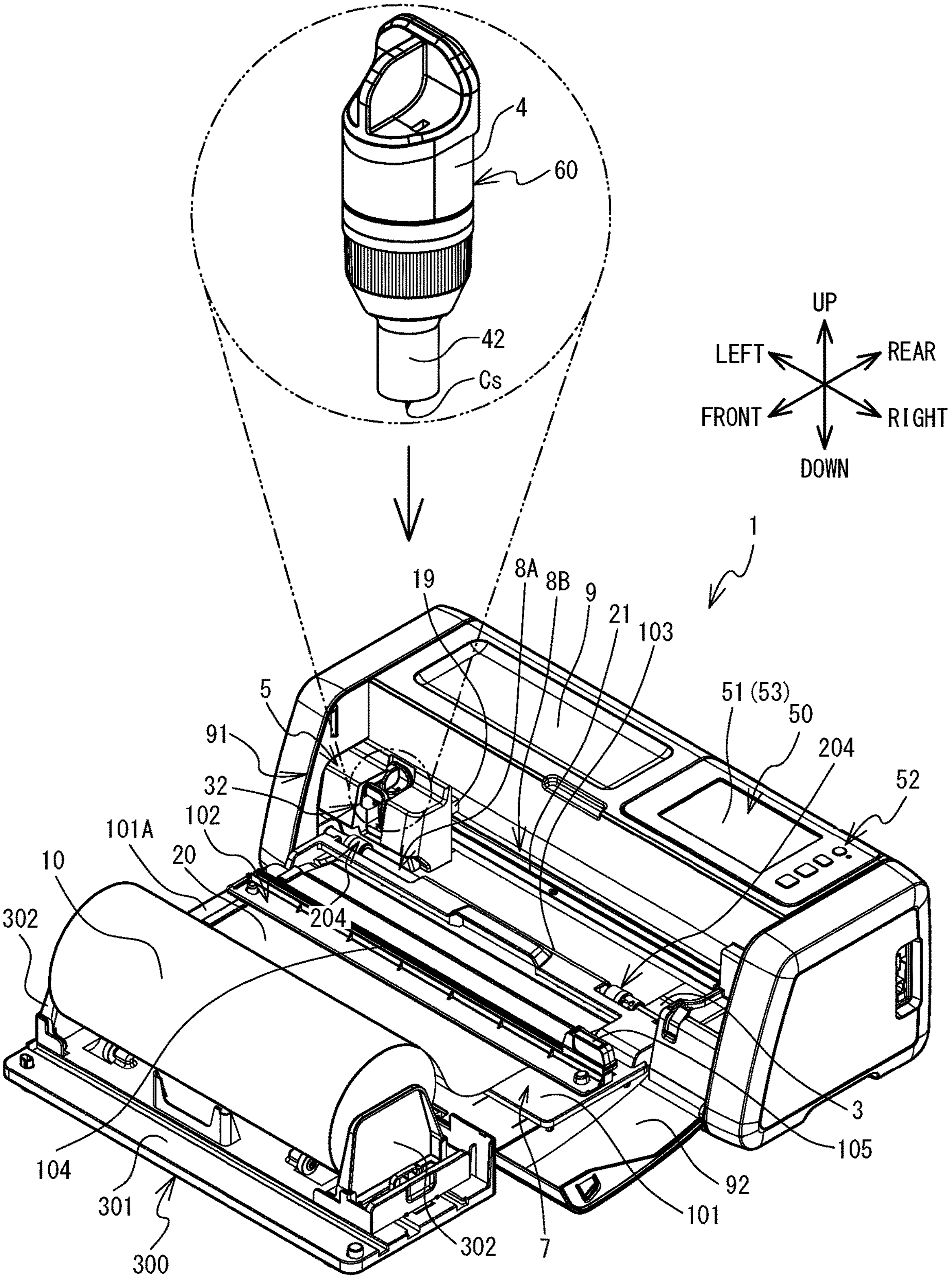
FIG. 1 is a perspective view of a cutting device.

As shown in FIG. 1, the cutting device 1 is provided with a main body cover 9, a platen 3, a head 5, a sheet feeding portion 7, a roll holding portion 300, a conveyance mechanism 8A, a first movement mechanism 8B, a second movement mechanism 33 (refer to FIG. 2), a control portion 71 (refer to FIG. 5), and the like. The main body cover 9 is provided with an opening 91, a cover 92, and an operating portion 50. The opening 91 is an opening provided in a front surface portion of the main body cover 9. The cover 92 is supported by the main body cover 9 so as to be able to rotate. In FIG. 1, the cover 92 is open such that the opening 91 is open. Hereinafter, various configurations will be explained based on the assumption that the cover 92 is in the open state.

The operating portion 50 is provided with a liquid crystal display (LCD) 51, a plurality of operating switches 52, and a touch panel 53. An image including various items, such as commands, illustrations, setting values, and messages is displayed on the LCD 51. The touch panel 53 is provided on the surface of the LCD 51. A user performs a pressing operation (hereinafter, this operation is referred to as a "panel operation") on the touch panel 53, using either a finger or a stylus pen. In the cutting device 1, which of the items has been selected is recognized in accordance with a pressed position detected by the touch panel 53. The user can use the operating switches 52 and the touch panel 53 to select a pattern displayed on the LCD 51, set various parameters, perform an input operation, and the like.

The sheet feeding portion 7 is provided with a main body portion 101, a cutting portion 102, and a fixing portion 103. The main body portion 101 has a rectangular plate shape, and is disposed above the cover 92. A guide 101A is provided on the left end portion of the main body portion 101. The guide 101A protrudes upward from the upper surface of the main body portion 101. The position of the object to be cut 20 is determined in the left-right direction by the object to be cut 20 coming into contact with the guide 101A from the right side. The cutting portion 102 is detachably provided on the upper portion of the main body portion 101. The cutting portion 102 includes a cutter plate 104 and a cutter 105. The cutter plate 104 extends in a straight line in the left-right direction. The cutter 105 can slidingly move along the cutter plate 104. The fixing portion 103 fixes the main body portion 101 above the cover 92.

The roll holding portion 300 includes a main body portion 301 and a pair of sheet holding plates 302. The main body portion 301 has a rectangular plate shape, and is fixed to the front end portion of the cover 92. The pair of sheet holding plates 302 are provided on the upper surface and at the left and right end portions of the main body portion 301. The pair of sheet holding plates 302 rotatably hold both end portions, in the left-right direction, of a roll 10 on which the object to be cut 20 is wound. The object to be cut 20 fed out from the roll 10 extends toward the sheet feeding portion 7 positioned to the rear, and passes below the cutter plate 104 of the cutting portion 102. The user can cut the object to be cut 20 in a width direction, by moving the cutter 105 along the cutter plate 104 from the right end to the left end, for example.

The conveyance mechanism 8A is provided with a driven roller 204 and a drive roller (not shown in the drawings). The driven roller 204 extends in the left-right direction and is rotatably supported inside the main body cover 9. The drive roller faces the driven roller 204 from below, and rotates in accordance with the driving of a Y-axis motor 15 (refer to FIG. 5). The conveyance mechanism 8A clamps, between the driven roller 204 and the drive roller, the object to be cut 20 extending rearward from the roll holding portion 300 via the sheet feeding portion 7. The conveyance mechanism 8A can convey the object to be cut 20 in the front-rear direction (also referred to as a "Y direction" and a "sub-scanning direction"), as a result of the drive roller rotating in this state.

The platen 3 is provided inside the main body cover 9, and further to the rear than the drive roller. The platen 3 is a plate-shaped member that extends in the left-right direction. The length of the platen 3 in the left-right direction is greater than the width of the object to be cut 20. The object to be cut 20 that is conveyed to the rear by the conveyance mechanism 8A is placed on a portion of the upper surface of the platen 3 excluding portions at both ends in the left-right direction. The release paper 20B (refer to FIG. 7) of the object to be cut 20 is disposed below the sheet material 20A, and comes into contact, from above, with the upper surface of the platen 3 (refer to FIG. 7). The left and right end portions of the platen 3 are exposed even when the object to be cut 20 is placed thereon.

Figure 2:
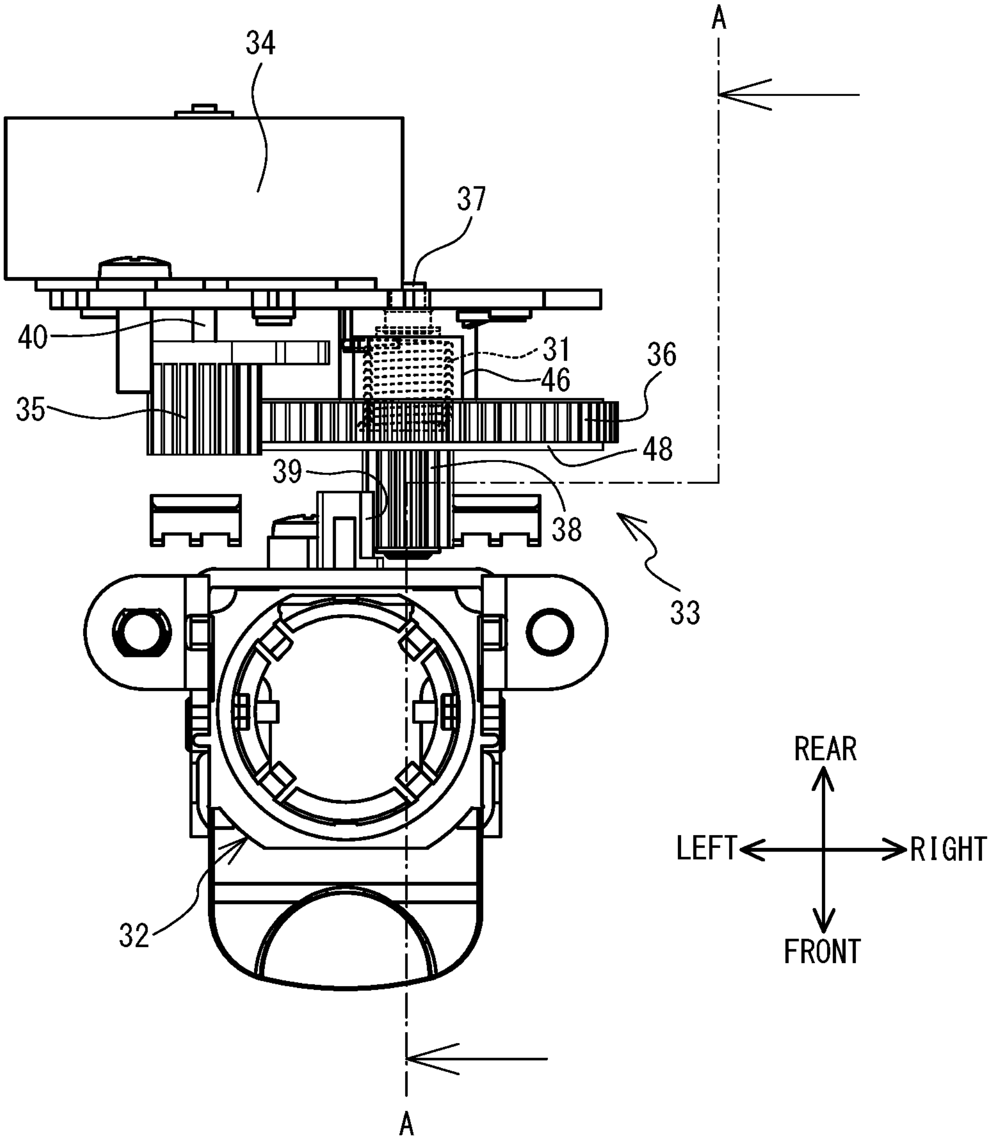
FIG. 2 is a plan view of a mounting portion and a second movement mechanism.

The head 5 is provided with a carriage 19, a mounting portion 32, a detector 61 (refer to FIG. 3), and the second movement mechanism 33 (refer to FIG. 2). The mounting portion 32 is able to be fitted with the cartridge 4. The cartridge 4 is fixed to the mounting portion 32 in a state in which the cutting blade Cs is arranged on the lower end of the cartridge 4. The carriage 19 is provided on the rear end portion of the mounting portion 32.

The head 5 can be moved in the left-right direction (also referred to as an "X direction" and a "main scanning direction") by the first movement mechanism 8B. The first movement mechanism 8B is provided with a guide rail 21, an X-axis motor 25 (refer to FIG. 5), and the like. The guide rail 21 is fixed inside the main body cover 9, and extends in the left-right direction. The carriage 19 can move in the X direction along the guide rail 21, and is supported by the guide rail 21. The rotational movement of the X-axis motor 25 is converted to a movement in the X direction, and is transmitted to the carriage 19. When the X-axis motor 25 is driven forward or in reverse, the carriage 19 is moved in the leftward direction or the rightward direction. In other words, the first movement mechanism 8B causes the cartridge 4 mounted on the mounting portion 32 of the head 5 to move in the left-right direction relative to the object to be cut 20 placed on the platen 3.

As shown in FIG. 2, the second movement mechanism 33 moves the mounting portion 32 in a direction in which the mounting portion 32 moves toward the platen 3 (i.e. downward), and a direction in which the mounting portion 32 moves away from the platen 3 (i.e. upward). Using the above-described configuration, the second movement mechanism 33 moves the cartridge 4 mounted to the mounting portion 32 in the upward and downward directions. The second movement mechanism 33 is provided with a Z-axis motor 34 (refer to FIG. 5), and a transmission member. The second movement mechanism 33 uses the transmission member coupled to an output shaft 40 of the Z-axis motor 34 to decelerate and convert a rotational movement of the Z-axis motor 34 into an up-down movement, transmits the up-down movement to the mounting portion 32, and drives the mounting portion 32 and the cartridge 4 in the up-down direction (also referred to as a "Z direction").

Figure 3:
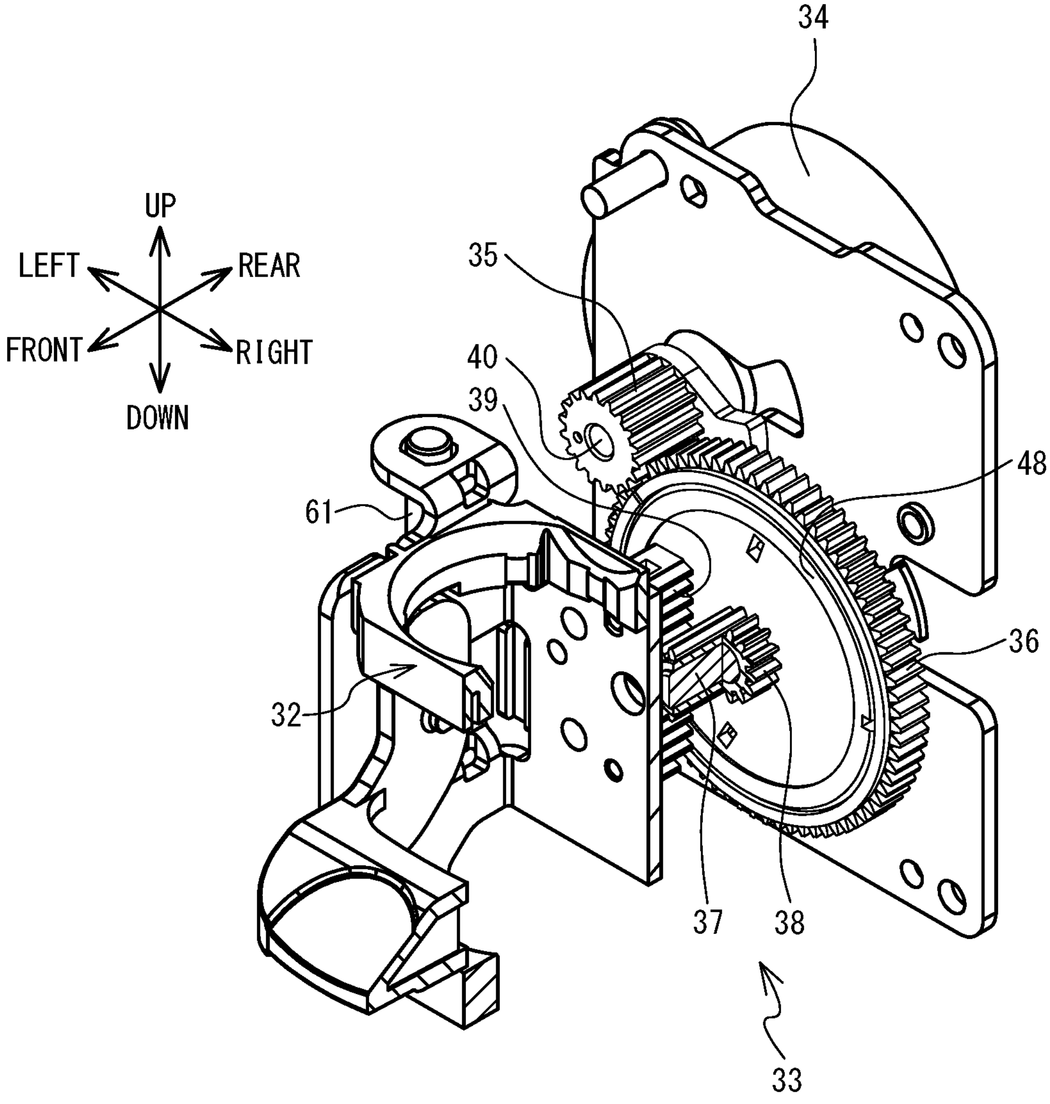
FIG. 3 is a perspective view of the mounting portion and the second movement mechanism cut along a line A-A shown in FIG. 2.

As shown in FIG. 2 and FIG. 3, the second movement mechanism 33 includes, as transmission members, gears 35 and 36, a shaft 37, a plate portion 48, a pinion 38, and a rack 39. The gear 35 is fixed to a front end of the output shaft 40 of the Z-axis motor 34. The gear 35 meshes with the gear 36. A diameter of the gear 35 is smaller than a diameter of the gear 36. The gear 36 includes a cylindrical shaft portion 46 that extends in the front-rear direction. The shaft 37 is inserted through the shaft portion 46 of the gear 36. The output shaft 40 of the Z-axis motor 34 and the shaft 37 extend in the front-rear direction. The plate portion 48 is a disc-shaped plate that is slightly smaller than the diameter of the gear 36. A front end portion of the plate portion 48 is coupled to a rear end portion of the pinion 38. The plate portion 48 is a member that is integrated with the pinion 38. The plate portion 48 is a member that is separate from the gear 36. The plate portion 48 and the pinion 38 can rotate independently of the rotation of the gear 36. The shaft 37 is inserted through the pinion 38 and the plate portion 48, to the front of the gear 36. The pinion 38 and the plate portion 48 can rotate relative to the shaft 37. The diameter of the pinion 38 is smaller than the diameters of the gears 35 and 36. The rack 39 extends in the up-down direction, and gear teeth with which the pinion 38 meshes are provided on the right surface of the rack 39. The rack 39 is fixed to the rear surface of the mounting portion 32.

The second movement mechanism 33 is further provided with a pressure applying mechanism 31. The pressure applying mechanism 31 is a torsion spring that is inserted through the shaft portion 46 of the gear 36. The pressure applying mechanism 31 is a mechanism that can apply a downward pressure to the mounting portion 32. One end of the pressure applying mechanism 31 is fixed to the shaft portion 46, and the other end is fixed to the plate portion 48. The pressure applying mechanism 31 transmits the rotation of the gear 36 to the plate portion 48. The pressure applying mechanism 31 applies the downward pressure to the mounting portion 32, by using an elastic force when the torsion spring is compressed in accordance with the rotation of the gear 36. The downward pressure applied to the mounting portion 32 changes in accordance with a compression amount of the torsion spring changing.

The detector 61 is a position sensor that can output a position, in the up-down direction, of the mounting portion 32. The detector 61 is disposed to the left and rear of the mounting portion 32. The detector 61 can identify the position of the mounting portion 32 in the up-down direction, and can output a signal indicating the identified position.

Overview of Cartridge 4

Figure 4:
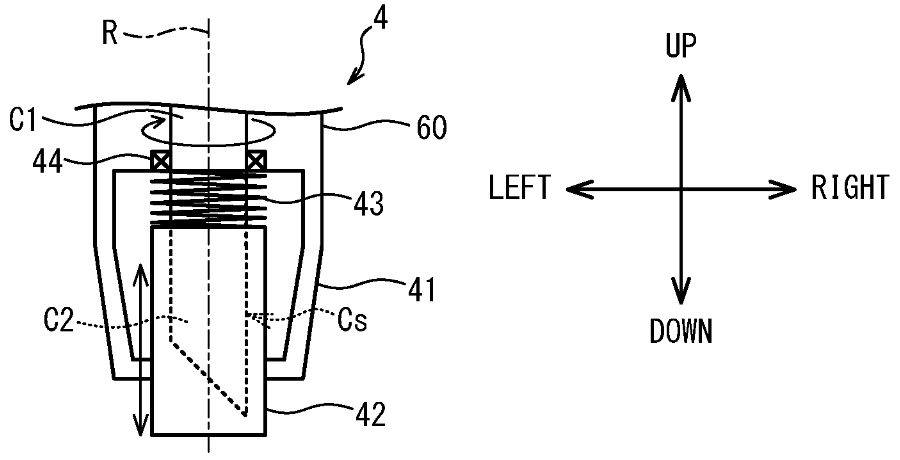
FIG. 4 is a diagram showing a configuration of a housing tip end of a cartridge.

An overview of the cartridge 4 will be explained with reference to FIG. 4. It is assumed that the upward direction, the downward direction, the leftward direction and the rightward direction in FIG. 4 are, respectively, the upward direction, the downward direction, the leftward direction, and the rightward direction of the cartridge 4. The cartridge 4 includes a cylindrical housing 60 (refer to FIG. 1). A holder 42, a spring 43, the cutting blade Cs, and a bearing 44 are provided on the tip end of the housing 60 (hereinafter referred to as a housing tip end 41).

The holder 42 is cylindrically shaped, and extends in the up-down direction. The holder 42 is held so as to be able to move in the up-down direction with respect to the housing tip end 41. The spring 43 is provided at the upper end portion of the holder 42. The spring 43 urges the holder 42 downward. The lower end portion of the holder 42 protrudes downward from the housing tip end 41. The cutting blade Cs includes a base portion C1, and a blade tip portion C2 connected to the lower end of the base portion C1. The base portion C1 has a round columnar shape, and is fixed to the housing tip end 41 via the bearing 44. The bearing 44 rotatably supports the cutting blade Cs, with a rotational axis R extending in the up-down direction as a center of rotation. The cutting blade Cs rotates centered on the rotational axis R in accordance with the action of an external force. The blade tip portion C2 has a plate shape, and a tip end thereof is inclined with respect to the horizontal direction. At least a part of the blade tip portion C2 is contained inside the holder 42.

When cutting the object to be cut 20 using the cartridge 4, by pressing the cartridge 4 against the object to be cut 20 with the cartridge 4 oriented downward, the holder 42 moves upward in resistance to the urging force of the spring 43. The tip end portion (hereinafter referred to as the "tip end of the cutting blade Cs") of the blade tip portion C2 of the cutting blade Cs is exposed from the holder 42 (refer to FIG. 7, to be described later). In this way, the cartridge 4 is able to cut the object to be cut 20 using the exposed tip end of the cutting blade Cs.

Electrical Configuration of Cutting Device 1

Figure 5:
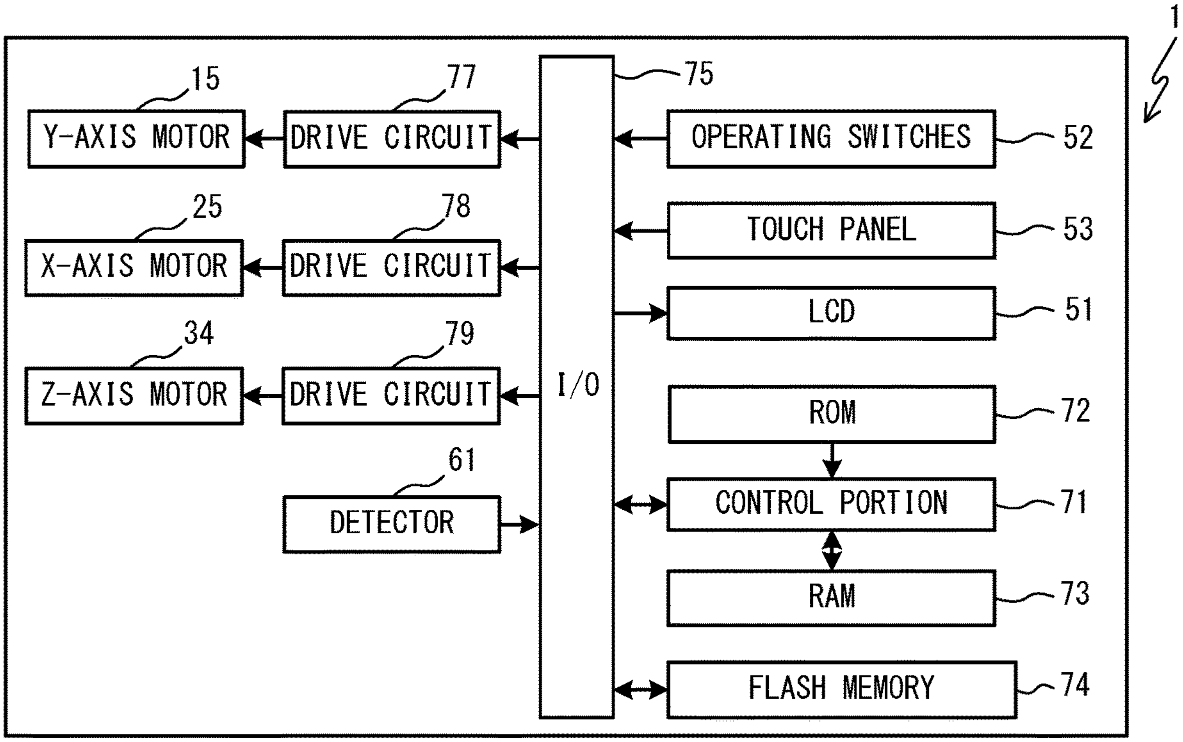
FIG. 5 is a block diagram showing an electrical configuration of the cutting device.

An electrical configuration of the cutting device 1 will be explained with reference to FIG. 5. The cutting device 1 is provided with the control portion 71, a ROM 72, a RAM 73, and an input/output (I/O) interface 75. The control portion 71 is electrically connected to the ROM 72, the RAM 73, and the I/O interface 75. The control portion 71 is a CPU that performs overall control of the cutting device 1, along with the ROM 72 and the RAM 73. The ROM 72 stores various programs used to operate the cutting device 1. The RAM 73 temporarily stores arithmetic calculation results and the like calculated by the control portion 71.

Further, a flash memory 74, the LCD 51, the operating switches 52, the touch panel 53, the detector 61, and drive circuits 77 to 79 are connected to the I/O interface 75. The flash memory 74 is a non-volatile storage element that stores various parameters, cutting data, and the like. The cutting data represents control conditions of the conveyance mechanism 8A, the first movement mechanism 8B, and the second movement mechanism 33, for cutting the object to be cut 20 using the cutting blade Cs (refer to FIG. 1) and cutting out a desired pattern. The cutting data includes start coordinates and end coordinates for controlling the conveyance mechanism 8A, the first movement mechanism 8B, and the second movement mechanism 33, for each of line segments included in the pattern. An origin point of a coordinate system is a point to the rear left of a region in which the cutting is possible. The left-right direction is set as the X direction, and the front-rear direction is set as the Y direction. The cutting data is stored in the flash memory 74 for each of patterns that are a target of the cutting.

The LCD 51 can perform notification of various commands. The detector 61 outputs the signal indicating the position, in the up-down direction, of the mounting portion 32. Each of the Y-axis motor 15, the X-axis motor 25, and the Z-axis motor 34 is a pulse motor. The drive circuits 77 to 79 respectively output a pulse to the Y-axis motor 15, the X-axis motor 25, and the Z-axis motor 34. The control portion 71 drives the Y-axis motor 15, the X-axis motor 25, and the Z-axis motor 34 via the drive circuits 77 to 79, and thus controls the conveyance mechanism 8A, the first movement mechanism 8B, and the second movement mechanism 33. In this way, the control portion 71 moves the mounting portion 32 and the object to be cut 20 placed on the platen 3 relative to each other.

Relationship Between Pressure Applied to Mounting Portion 32 (Pressure Correspondence Value) and Movement Amount A relationship between the pressure applied to the mounting portion 32 by the pressure applying mechanism 31 in the course of the cutting device 1 cutting the object to be cut 20 using the cutting blade Cs and a movement amount of the mounting portion 32 will be explained. In the following explanation, it is assumed that the object to be cut 20 is placed on the platen 3, and that the cartridge 4 is mounted to the mounting portion 32. Hereinafter, the position of the mounting portion 32, in the up-down direction, when the mounting portion 32 has been moved by the second movement mechanism 33 to a highest position, is referred to as an upper limit position.

The control portion 71 moves the mounting portion 32 downward from the upper limit position by rotating the Z-axis motor 34 of the second movement mechanism 33. There is a correlation between a number of pulses output from the drive circuit 79 and input to the Z-axis motor 34, and a downward pressure acting on the mounting portion 32 from the pressure applying mechanism 31 (refer to FIG. 2). In the embodiment, a cumulative number of the pulses input to the Z-axis motor 34 is used as a pressure correspondence value corresponding to the pressure applied to the mounting portion 32 from the pressure applying mechanism 31. In other words, the cumulative number of pulses input to the Z-axis motor 34 from a state in which the mounting portion 32 is disposed at the upper limit position is used as the pressure correspondence value.

As shown in FIG. 2 and FIG. 3, the output shaft 40 and the gears 35 and 36 rotate in accordance with the pulse being input to the Z-axis motor 34, and the pressure applying mechanism 31 transmits the rotation of the gear 36 to the plate portion 48. The control portion 71 counts the number of pulses input to the Z-axis motor 34 when the mounting portion 32 moves downward, and detects the pressure correspondence value. At the same time, the control portion 71 identifies the position, in the up-down direction, of the mounting portion 32 on the basis of the signal output from the detector 61, and detects the movement amount from the upper limit position. The control portion 71 periodically repeats the detection of the pressure correspondence value and the movement amount, and stores the detected pressure correspondence value and movement amount in association with each other in the RAM 73. Hereinafter, this processing is referred to as "detection processing."

FIG. 6 shows the relationship between the pressure correspondence value (vertical axis) and the movement amount (horizontal axis), which are detected by periodically repeating the detection processing. A case is assumed in which the mounting portion 32 has been moved downward from a state in which the cutting blade Cs is facing the object to be cut 20 from above. A unit of the movement amount is referred to as a unit, for convenience. The detection processing that is performed an i-th time (where i is an integer of 1 or more) is referred to as "i-th detection processing." The pressure correspondence value detected by the i-th detection processing is denoted by "v(i)." The movement amount detected by the i-th detection processing is denoted by "m(i)." The pressure applied to the mounting portion 32 by the pressure applying mechanism 31 as a result of controlling the second movement mechanism 33 using the pressure correspondence value v(i) is denoted by "p(i)."

Figure 7:
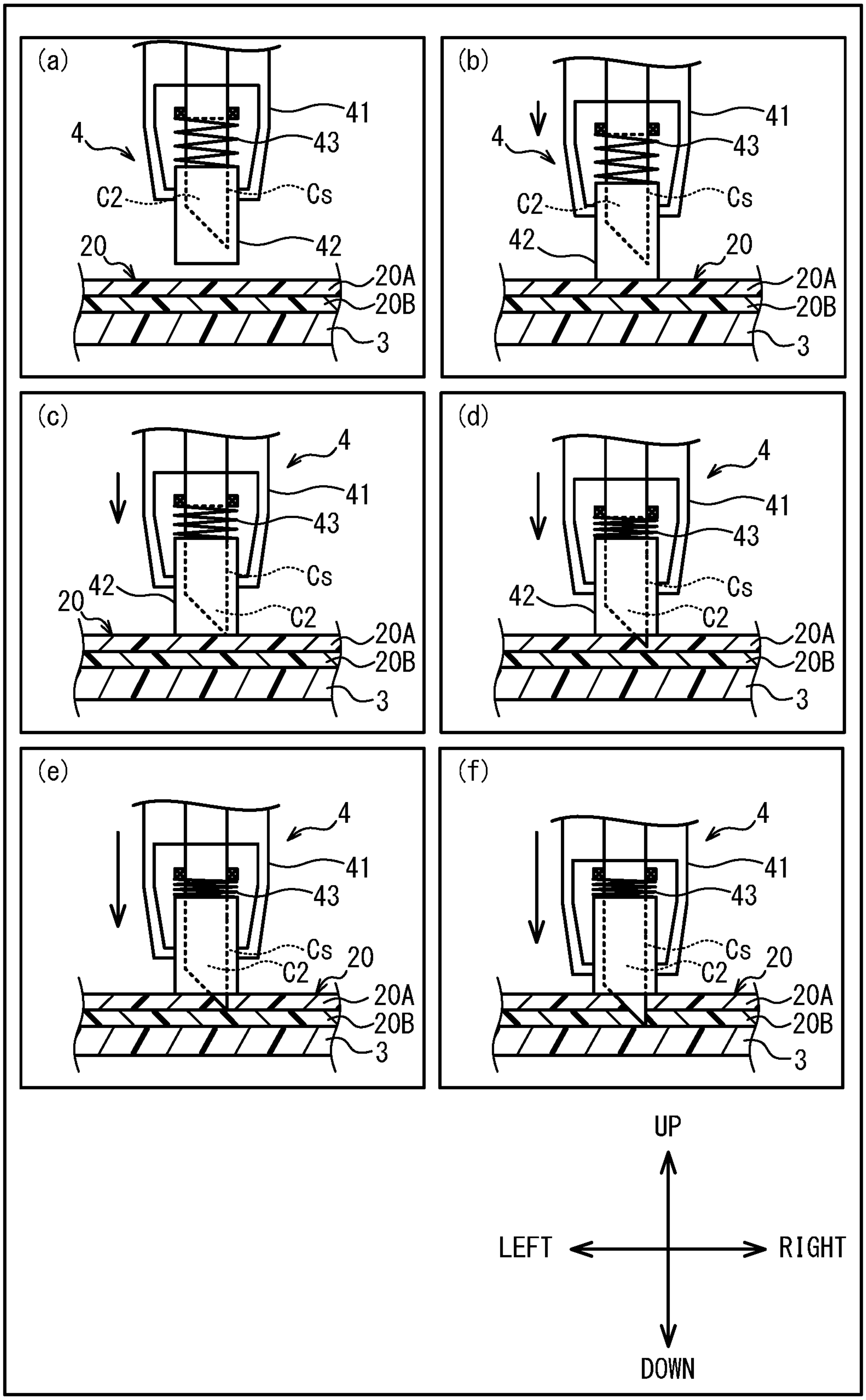
FIG. 7 is explanatory diagrams describing positional relationships between the housing tip end of the cartridge 4, and a platen 3 and the object to be cut.

As shown in FIG. 7(*a*), in a state in which the holder 42 of the cartridge 4 is not in contact with the object to be cut 20, an upward pressure is not applied to the mounting portion 32 to which the cartridge 4 is mounted (refer to FIG. 2 and FIG. 3). Thus, when the output shaft 40 of the Z-axis motor 34 (refer to FIG. 2 and FIG. 3) has rotated, the pressure applying mechanism 31 (refer to FIG. 2) transmits the rotation of the gear 36 (refer to FIG. 2 and FIG. 3) to the plate portion 48 and the pinion 38 (refer to FIG. 2 and FIG. 3). The plate portion 48 and the pinion 38 rotate by the same amount as the rotation of the gear 36. As a result, the mounting portion 32 moves downward.

Figure 6A:
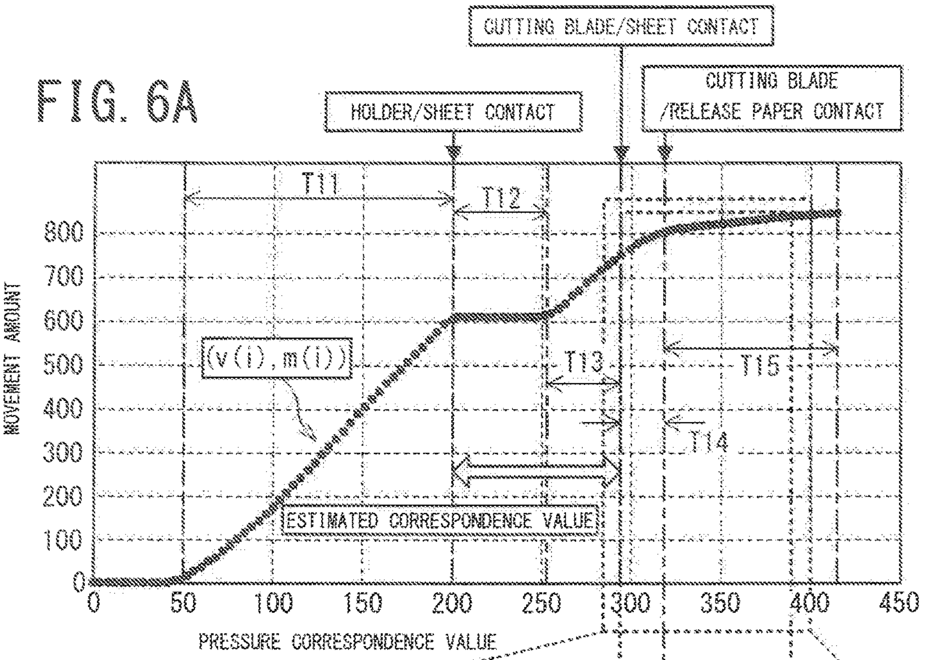
FIG. 6A and FIG. 6B are graphs showing a relationship between a pressure correspondence value, a movement amount, and a difference amount when an object to be cut has been moved downward.

As shown in FIG. 6A, in the course of the mounting portion 32 moving downward, during a period until the holder 42 comes into contact with the object to be cut 20 (refer to FIG. 7(*a*)), as shown by a plot in a region T11, the movement amount becomes larger as the pressure correspondence value increases. In the course of the mounting portion 32 moving downward, when the holder 42 of the cartridge 4 has come into contact with the sheet material 20A of the object to be cut 20 (refer to FIG. 7(*b*)), the upward pressure acts on the mounting portion 32. By pulses being continuously input to the Z-axis motor 34, the output shaft 40 rotates further. The gear 36 rotates relative to the plate portion 48 and the pinion 38, and the torsion of the pressure applying mechanism 31 increases. In accordance with the rotation of the gear 36 being transmitted to the plate portion 48, the downward pressure acting on the mounting portion 32 by the pressure applying mechanism 31 gradually increases. However, the plate portion 48 and the pinion 38 do not rotate until the downward pressure acting on the mounting portion 32 exceeds the upward pressure applied to the mounting portion 32. In this case, the mounting portion

32 does not move downward. Thus, as shown by a plot in a region T12, even if the pressure correspondence value increases, the movement amount transitions at a constant level (approximately 600 units).

When the pulses are continuously input to the Z-axis motor 34 and the output shaft 40 rotates further, the gear 36 rotates relative to the plate portion 48 and the pinion 38, and the torsion of the pressure applying mechanism 31 increases further. The downward pressure from the pressure applying mechanism 31 acting on the mounting portion 32 via the plate portion 48 and the pinion 38 increases further. When the downward pressure from the pressure applying mechanism 31 acting on the mounting portion 32 exceeds the upward pressure applied to the mounting portion 32, the pinion 38 rotates, and the downward movement of the mounting portion 32 re-starts (refer to FIG. 7(*b*) and FIG. 7(*c*)). Since the holder 42 is in contact with the sheet material 20A, the downward movement of the holder 42 is suppressed, and thus, the cutting blade Cs moves downward relative to the holder 42, and the spring 43 is compressed. The downward pressure from the pressure applying mechanism 31 acting on the mounting portion 32 moves the mounting portion 32 downward in resistance to the upward pressure that accords with an elastic force of the spring 43. Thus, as shown by a plot in a region T13, the movement amount becomes larger as the pressure correspondence value increases.

In the course of the mounting portion 32 moving further downward, when the cutting blade Cs of the cartridge 4 has come into contact with the sheet material 20A of the object to be cut 20 (refer to FIG. 7(*c*)), the upward pressure acts on the cutting blade Cs (the mounting portion 32). By pulses being continuously input to the Z-axis motor 34, the output shaft 40 rotates further. The gear 36 rotates relative to the plate portion 48 and the pinion 38, and the torsion of the pressure applying mechanism 31 increases. In this state, the mounting portion 32 continues to move downward, and the blade tip of the cutting blade Cs penetrates into the sheet material 20A (refer to FIG. 7(*d*)). Since the mounting portion 32 moves downward while receiving the upward pressure, a downward movement speed of the mounting portion 32 is slower compared to before the cutting blade Cs comes into contact with the sheet material 20A (refer to FIG. 7(*b*)). Thus, as shown by a plot in a region T14, a rate of increase (a gradient) of the movement amount is gentler than the rate of increase (the gradient) of the movement amount in the region T13.

The blade tip of the cutting blade Cs of the cartridge 4 passes through the sheet material 20A and comes into contact with the release paper 20B (refer to FIG. 7(*e*)). The release paper 20B is harder than the sheet material 20A. As a result, in a similar manner to when the blade tip of the cutting blade Cs has come into contact with the sheet material 20A (refer to FIG. 7(*c*)), the downward movement of the mounting portion 32 becomes more difficult, and the upward pressure acting on the mounting portion 32 increases. Thus, in the course of the cutting blade Cs passing through the release paper 20B (refer to FIG. 7(*f*)), as shown by a plot in a region T15, the rate of increase (the gradient) of the movement amount is even more gentle than the rate of increase (the gradient) of the movement amount in the region T14.

Main Processing

Main processing executed by the control portion 71 of the cutting device 1 will be explained with reference to FIG. 8 to FIG. 11. In the main processing, first, the pressure to be applied to the mounting portion 32 is decided (hereinafter referred to as a "cutting pressure") in order to cut only the sheet material 20A without cutting the release paper 20B of the object to be cut 20 (to perform the half cut). In other words, the pressure correspondence value in order to apply the cutting pressure to the mounting portion 32 by the pressure applying mechanism 31 is decided (hereinafter, this pressure correspondence value is referred to as a "cutting pressure correspondence value") (step S11 to step S25 (refer to FIG. 8), step S41 to step S61 (refer to FIG. 9), step S81 to step S91 (refer to FIG. 10), and step S101 to step S113 (refer to FIG. 11)). After that, the second movement mechanism 33 is controlled on the basis of the decided cutting pressure correspondence value, and the sheet material 20A of the object to be cut 20 is cut by the cutting blade Cs (step S63, step S65 (refer to FIG. 9)).

When a command for specifying a pattern and starting the cutting operation is input by a panel operation, the main processing is started by the control portion 71 reading out a program stored in the ROM 72 and executing the program. As shown in FIG. 1, the roll 10 is set on the roll holding portion 300 before the above-described panel operation is performed, and the object to be cut 20 is fed out from the roll 10. The fed out object to be cut 20 passes below the cutter plate 104 of the sheet feeding portion 7, and a tip end portion of the object to be cut 20 is placed on the platen 3. Further, the cartridge 4 is mounted to the mounting portion 32. The mounting portion 32 is disposed in the upper limit position.

When the main processing is started, first, the control portion 71 performs initialization processing (step S1) (refer to FIG. 11), in order to detect the position of the mounting portion 32 in the up-down direction, when the cutting blade Cs comes into contact with the platen 3 (hereinafter referred to as a "reference position").

The initialization processing will be explained with reference to FIG. 11. The control portion 71 controls the first movement mechanism 8B and moves the mounting portion 32 to a furthest right end, of a movable range of the mounting portion 32 in the left-right direction (step S101). In this way, the mounting portion 32 is disposed above a portion that is the right end portion of the platen 3 and that is exposed as a result of the object to be cut 20 not being placed thereon. At this time, the cutting blade Cs does not face the object to be cut 20 in the up-down direction, and faces the platen 3. Next, the control portion 71 controls the second movement mechanism 33 and starts to move the mounting portion 32 downward from the upper limit position (step S103). At the same time, the control portion 71 starts the detection processing. As a result, the detection of the pressure correspondence value and the movement amount is periodically repeated, and the detected pressure correspondence value and movement amount are stored in the RAM 73.

Figure 11:
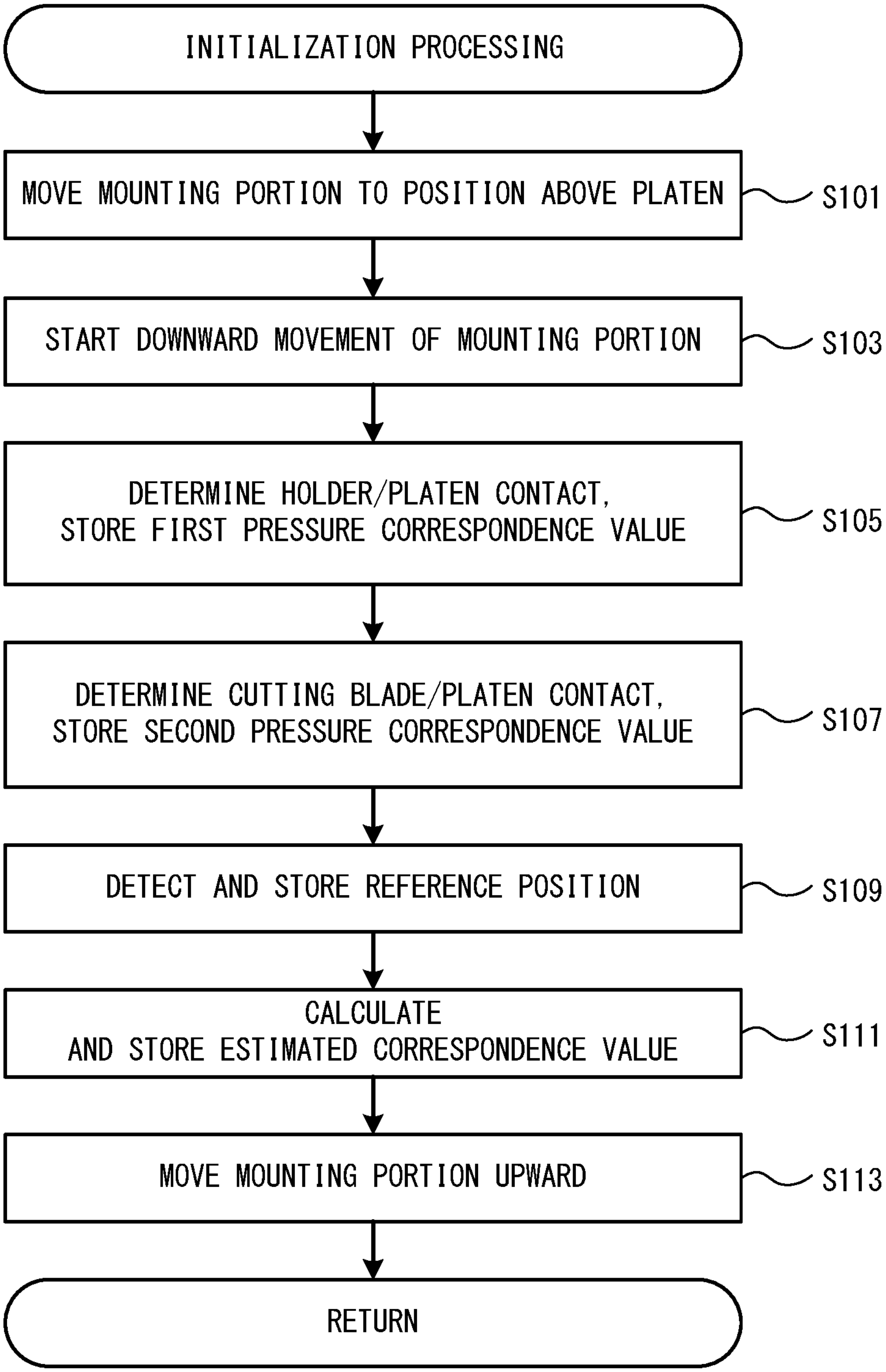
FIG. 11 is a flowchart of initialization processing.
Figure 12:
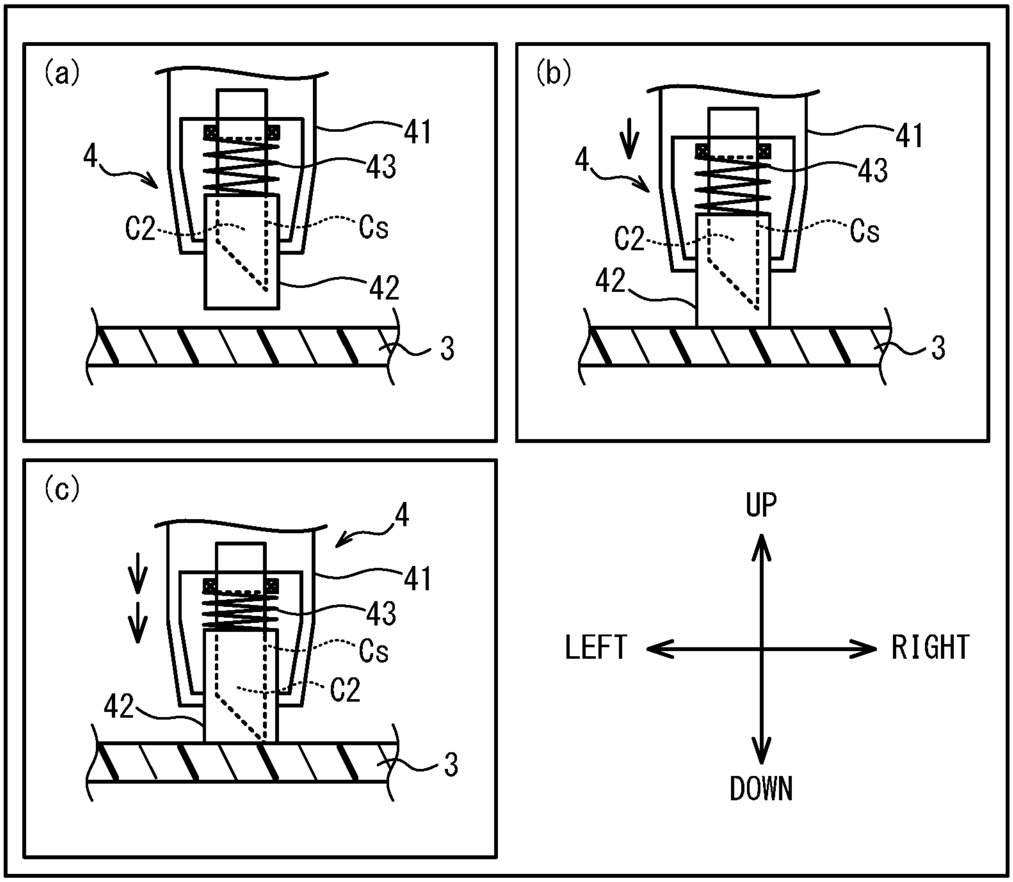
FIG. 12 is explanatory diagrams illustrating a positional relationship between the housing tip end 41 of the cartridge 4 and the platen.
Figure 13:
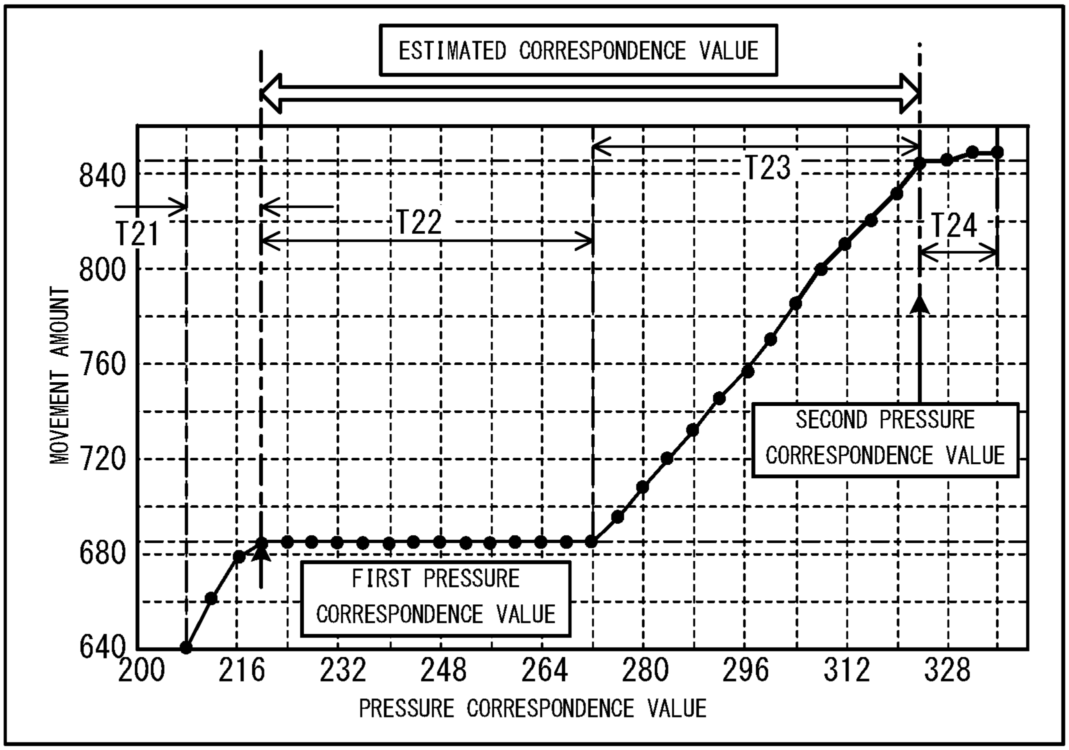
FIG. 13 is a graph showing a relationship between the pressure correspondence value and the movement amount during execution of the initialization processing.

As shown in FIG. 12(*a*) and FIG. 12(*b*), during a period from when the mounting portion 32 starts to move downward from the upper limit position to when the holder 42 of the cartridge 4 comes into contact with the platen 3, the upward pressure is not applied to the mounting portion 32. Thus, as shown by a plot in a region T21 in FIG. 13, the movement amount becomes larger in line with an increase in the pressure correspondence value. As shown in FIG. 12(*b*), when the holder 42 has come into contact with the platen 3, the upward pressure acts on the mounting portion 32, and the downward movement of the mounting portion 32 stops. As a result, as shown by a plot in a region T22 in FIG. 13, even if the pressure correspondence value increases, the movement amount transitions at a constant level (approximately 685 units). When the relationship between the pressure correspondence value and the movement amount shown in the region T22 has been detected, the control portion 71 determines that the holder 42 has come into contact with the platen 3, as shown in FIG. 11 (step S105). The control portion 71 identifies, as a first pressure correspondence value (refer to FIG. 13), the pressure correspondence value detected by the detection processing at the time point at which the holder 42 has come into contact with the platen 3, and stores the identified first pressure correspondence value in the RAM 73 (step S105).

When the downward pressure acting on the mounting portion 32 from the pressure applying mechanism 31 due to the continuous input of the pulses to the Z-axis motor 34 exceeds the upward pressure applied to the mounting portion 32, as shown in FIG. 12(*b*) and FIG. 12(*c*), the downward movement of the mounting portion 32 re-starts. In this case, as shown by a plot in a region T23 in FIG. 13, the movement amount increases in line with the increase in the pressure correspondence value.

As shown in FIG. 12(*c*), when the mounting portion 32 has moved further down and the cutting blade Cs has come into contact with the platen 3, the downward movement of the mounting portion 32 stops. Thus, as shown by a plot in a region T24 in FIG. 13, even if the pressure correspondence value increases, the movement amount transitions at a constant level (approximately 845 units). When the relationship between the pressure correspondence value and the movement amount shown in the region T24 has been detected, the control portion 71 determines that the cutting blade Cs has come into contact with the platen 3, as shown in FIG. 11 (step S107). The control portion 71 identifies, as a second pressure correspondence value (refer to FIG. 13), the pressure correspondence value detected by the detection processing at the time point at which the cutting blade Cs has come into contact with the platen 3, and stores the identified second pressure correspondence value in the RAM 73 (step S107).

The control portion 71 detects, as the position in the up-down direction of the mounting portion 32 at the time point at which the cutting blade Cs comes into contact with the platen 3 (referred to as the "reference position"), a position separated downward from the upper limit position by the movement amount detected by the detection processing at the time point at which the cutting blade Cs came into contact with the platen 3 (step S109). The control portion 71 stores the detected reference position in the RAM 73.

The control portion 71 reads out and acquires, from the RAM 73, the first pressure correspondence value identified by the processing at step S105 (refer to FIG. 13), that is, the pressure correspondence value detected by the detection processing at the time point at which the holder 42 comes into contact with the platen 3. The control portion 71 reads out and acquires, from the RAM 73, the second pressure correspondence value identified by the processing at step S107 (refer to FIG. 13), that is the pressure correspondence value detected by the detection processing at the time point at which the cutting blade Cs comes into contact with the platen 3. The control portion 71 calculates a value obtained by subtracting the first pressure correspondence value from the second pressure correspondence value (referred to as an "estimated correspondence value", refer to FIG. 13), as an estimated value of a change amount of the pressure correspondence value from when the holder 42 comes into contact with the sheet material 20A (refer to FIG. 7(*b*)) to when the cutting blade Cs comes into contact with the sheet material 20A (refer to FIG. (c)). The control portion 71 stores the calculated estimated correspondence value in the RAM 73 (step S111).

When the relationship between the pressure correspondence value and the movement amount shown in the region T24 has been detected, the control portion 71 controls the second movement mechanism 33 and stops the downward movement of the mounting portion 32 started by the processing at step S101. The control portion 71 stops the detection processing. The control portion 71 controls the second movement mechanism 33 and moves the mounting portion 32 upward toward the upper limit position (step S113). After the mounting portion 32 has moved up to the upper limit position, the control portion 71 controls the second movement mechanism 33 and stops the movement of the mounting portion 32. The control portion 71 ends the initialization processing, and returns the processing to the main processing (refer to FIG. 8).

After the initialization processing (step S11) is ended, the control portion 71 controls the first movement mechanism 8B, and moves the mounting portion 32 to the left. After the mounting portion 32 has moved to a position at which the cutting blade Cs faces, in the up-down direction, the object to be cut 20 placed on the platen 3, the control portion 71 controls the first movement mechanism 8B and stops the movement of the mounting portion 32 (step S13). The state is maintained in which the mounting portion 32 is disposed at the upper limit position in the up-down direction. The cutting blade Cs mounted to the mounting portion 32 is separated upward from the object to be cut 20. Hereinafter, the position of the mounting portion 32 after the processing at step S13 is referred to as a "facing position."

The control portion 71 controls the second movement mechanism 33, and starts to move the mounting portion 32 downward from the facing position (step S15). At the same time, the control portion 71 starts the detection processing. Then, the detection of the pressure correspondence value and the movement amount is periodically repeated, and the detected pressure correspondence value and movement amount are stored in the RAM 73 (step S17).

The control portion 71 determines whether or not the holder 42 of the cartridge 4 has come into contact with the sheet material 20A of the object to be cut 20. During a period from when the mounting portion 32 starts moving downward from the facing position to when the holder 42 of the cartridge 4 comes into contact with the sheet material 20A (refer to FIG. 7(*a*)), the rate of increase (the gradient) of the movement amount in relation to the pressure correspondence value transitions at a constant value (refer to region T11, FIG. 6). On the other hand, after the holder 42 has come into contact with the sheet material 20A (refer to FIG. 7(*b*)), even if the pressure correspondence value increases, the movement amount transitions at a constant level (refer to region T12, FIG. 6). Thus, when the relationship between the pressure correspondence value and the movement amount shown in the regions T11 and T12 is detected, that is when it is detected that the increase in the movement amount is extremely small or is not present, even when the pressure correspondence value increases, the control portion 71 determines that the holder 42 has come into contact with the sheet material 20A (step S19).

The control portion 71 reads out and acquires, from the RAM 73, the estimated correspondence value (refer to FIG. 13) calculated by the processing at step S111 (refer to FIG. 11). The control portion 71 determines, for each of the pressure correspondence value and the movement amount detected by the detection processing, whether or not a change amount of the pressure correspondence value from the time point at which the holder 42 comes into contact with the sheet material 20A matches the estimated correspondence value. When the change amount of the pressure correspondence value from the time point at which the holder 42 comes into contact with the sheet material 20A matches the estimated correspondence value, the control portion 71 determines that cutting blade Cs has come into contact with the sheet material 20A (step S21).

The control portion 71 reads out and acquires, from the RAM 73, the movement amount detected by the detection processing at the time point at which the cutting blade Cs is determined to have come into contact with the sheet material 20A. The control portion 71 identifies a position that is separated downward from the upper limit position by an amount corresponding to the acquired movement amount, as the position in the up-down direction of the mounting portion 32 at the time point at which the cutting blade Cs has come into contact with the sheet material 20A (hereinafter, this position is referred to as a "control position," refer to FIG. 7(*c*)). The control portion 71 reads out and acquires, from the RAM 73, the reference position detected by the processing at step S109 (refer to FIG. 11), that is, the position in the up-down direction of the mounting portion 32 at the time point at which the cutting blade Cs comes into contact with the platen 3 (refer to FIG. 12(*c*)). The control portion 71 detects, as the thickness of the object to be cut 20, a difference between the reference position and the control position (step S23).

The control portion 71 decides a difference threshold value, in accordance with the thickness of the object to be cut 20 detected by the processing at step S23 (step S25). The difference threshold value is a threshold value used for detecting whether the cutting blade Cs has come into contact with the release paper 20B (step S45, refer to FIG. 9), and will be described in more detail later. The difference threshold value is decided so as to become a larger value the greater the detected thickness of the object to be cut 20.

The method for deciding the difference threshold value in accordance with the thickness of the object to be cut 20 is not particularly limited, and the difference threshold value may be decided using the following method, for example. The control portion 71 may store a correspondence table, in which a plurality of ranges of the thickness of the object to be cut 20 are associated with the difference threshold value that accords with each of the ranges, in the flash memory 74 in advance, for example. The control portion 71 may decide the difference threshold value that is associated with the range in which the thickness of the object to be cut 20 detected by the processing at step S23 is included, on the basis of the correspondence table. Alternatively, the control portion 71 may store a calculation formula in the flash memory 74 in advance, for example, that can calculate the difference threshold value by substituting the thickness of the object to be cut 20. The control portion 71 may decide the difference threshold value by substituting the thickness of the object to be cut 20 detected by the processing at step S23 into the calculation formula. The control portion 71 stores the decided difference threshold value in the RAM 73.

Figure 6B:
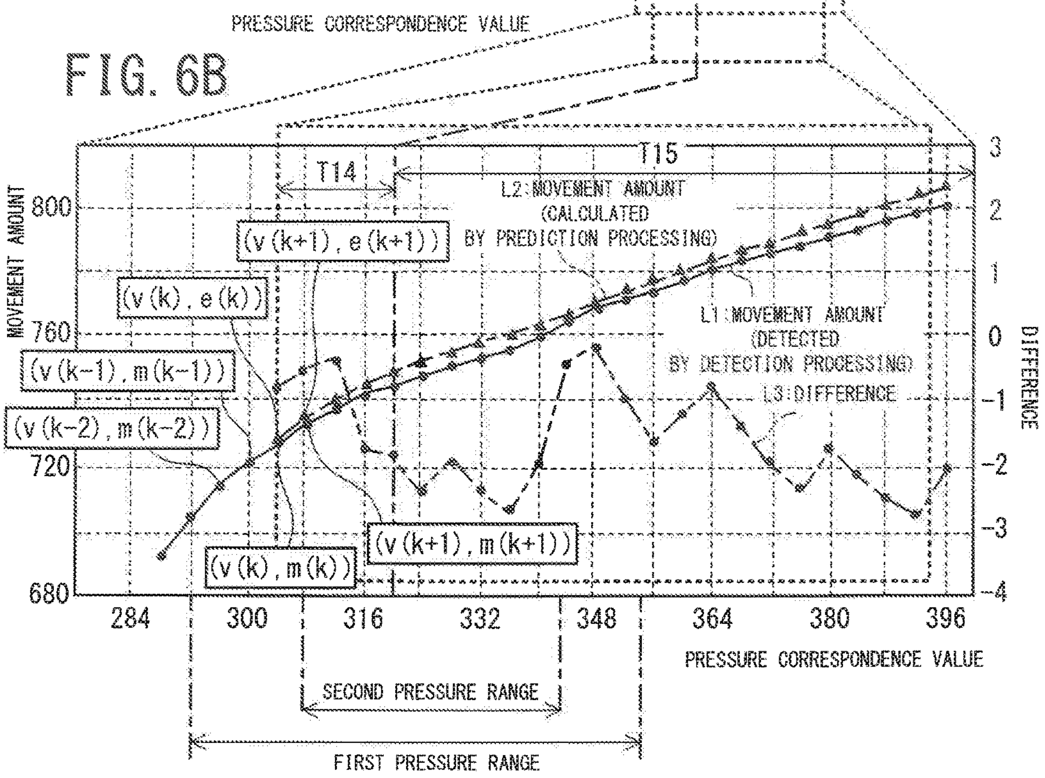
Figure 8:
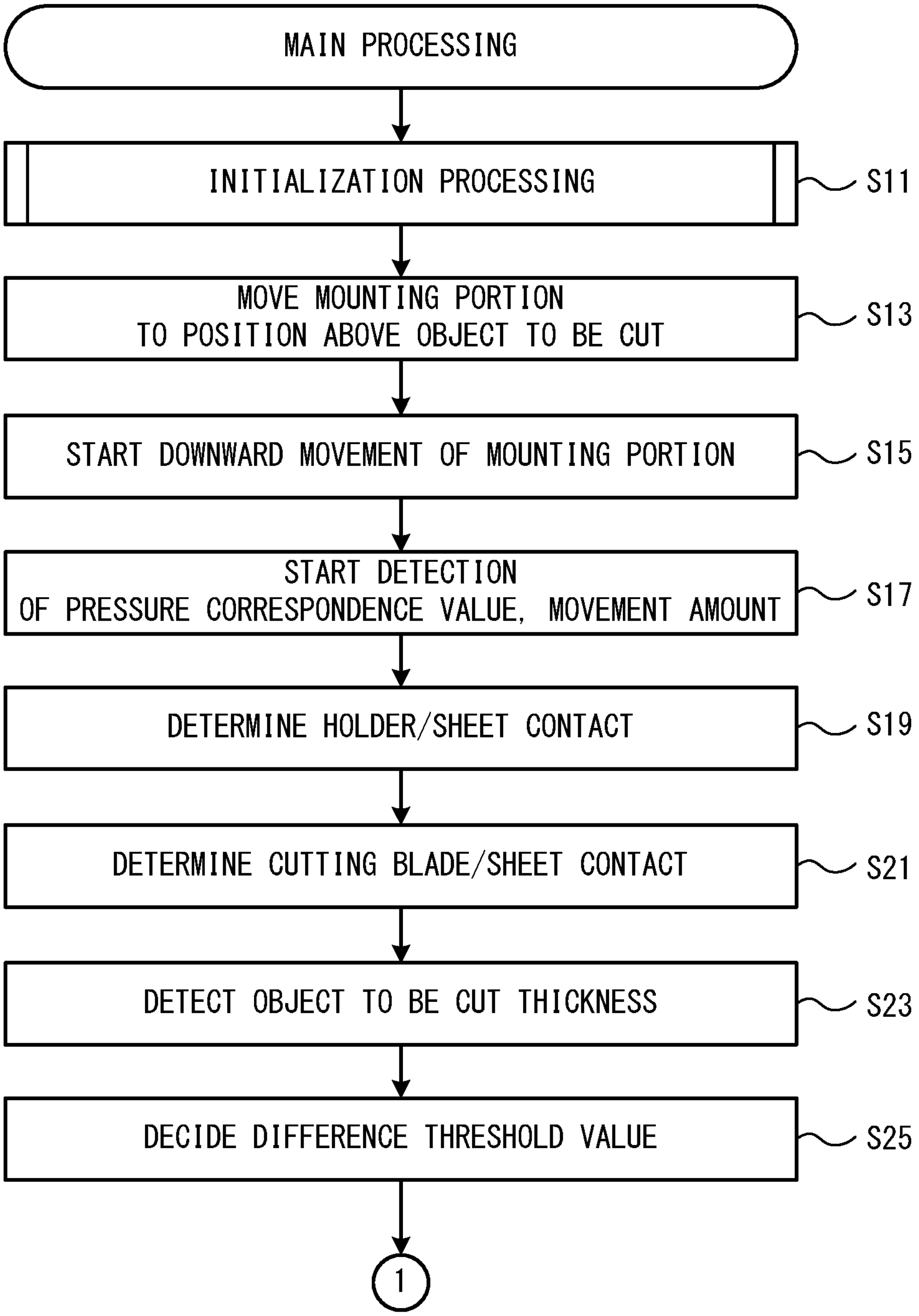
FIG. 8 is a flowchart of main processing.
Figure 9:
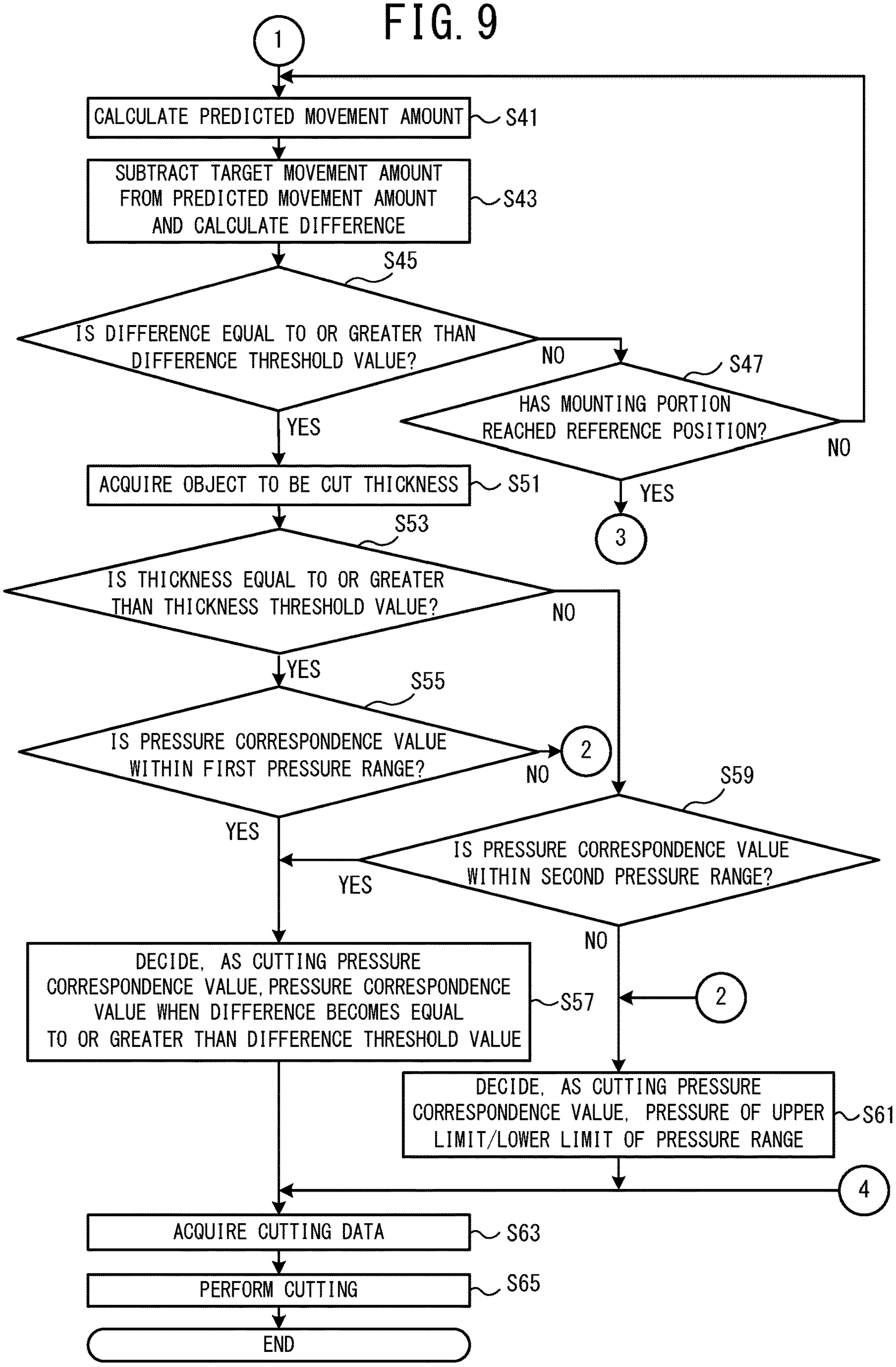
FIG. 9 is a flowchart of the main processing and is a continuation of FIG. 8.

As shown in FIG. 9, the control portion 71 performs prediction processing that is described below, and calculates a predicted movement amount (step S41). In processing at step S21 (refer to FIG. 8), it is assumed that it is determined that the cutting blade Cs has come into contact with the sheet material 20A on the basis of a movement amount m(k) detected by k-th detection processing. In this case, as shown in FIG. 6B, a pressure correspondence value v(k) and the movement amount m(k) detected by the k-th detection processing are, respectively, the pressure correspondence value and the movement amount detected at or after the time point at which the cutting blade Cs has come into contact with the sheet material 20A. On the other hand, a pressure correspondence value v(k−2) and a movement amount m(k−2) detected by k−2-th detection processing performed 2 cycles previous to the k-th detection processing, and a pressure correspondence value v(k−1) and a movement amount m(k−1) detected by k−1-th detection processing performed 1 cycle previous to the k-th detection processing are, respectively, the pressure correspondence values and the movement amounts detected before the cutting blade Cs has come into contact with the sheet material 20A. In the regions T13 and T14, in the course of the mounting portion 32 moving downward, the pressure applied to the mounting portion 32 by the pressure applying mechanism 31 gradually increases. Thus, a pressure p(k−1) corresponding to the pressure correspondence value v(k−1) is greater than a pressure p(k−2) corresponding to the pressure correspondence value v(k−2). Further, a pressure p(k) corresponding to the pressure correspondence value v(k) is larger than the pressure p(k−1).

On the basis of a change amount of the pressure correspondence value from the pressure correspondence value v(k−2) to the pressure correspondence value v(k−1) and a change amount of the movement amount from the movement amount m(k−2) to the movement amount m(k−1), the control portion 71 calculates a predicted value (hereinafter referred to as a "predicted movement amount") of the movement amount of the mounting portion 32 when the pressure p(k) corresponding to the pressure correspondence value v(k) is applied by the pressure applying mechanism 31 (step S41). The processing to calculate the predicted movement amount is referred to as the "prediction processing." After that, the control portion 71 performs the prediction processing each time the detection processing is performed for the k+1-th time onward (step S41). The prediction processing performed in accordance with the pressure correspondence value v(i) and the movement amount m(i) being detected by the i-th detection processing is referred to as "i-th prediction processing." The predicted movement amount calculated by the i-th prediction processing is denoted by "e(i)."

The method for calculating the predicted movement amount in the prediction processing will be explained using a specific example. For example, when the pressure correspondence value v(k) and the movement amount m(k) are detected by the k-th detection processing, the control portion 71 reads out and acquires, from the RAM 73, the pressure correspondence value v(k−2) and the movement amount m(k−2) detected by the k−2-th detection processing, and the pressure correspondence value v(k−1) and the movement amount m(k−1) detected by the k−1-th detection processing. The control portion 71 applies the least squares method on the basis of two coordinate points in FIG. 6B, ((v(k−2), m(k−2)) and (v(k−1), m(k−1))), and calculates a coordinate point (v(k), e(k)) corresponding to the pressure correspondence value v(k). The calculated value e(k) corresponds to the predicted movement amount calculated by the k-th prediction processing. The control portion 71 associates the pressure correspondence value v(k) and the calculated predicted movement amount e(k) with each other and stores the associated data in the RAM 73.

Next, when a pressure correspondence value v(k+1) and a movement amount m(k+1) are detected by the k+1-th detection processing, the control portion 71 reads out and acquires, from the RAM 73, the pressure correspondence value v(k−1) and the movement amount m(k−1) detected by the k−1-th detection processing, the pressure correspondence value v(k) detected by the k-th detection processing, and the predicted movement amount e(k) calculated by the k-th prediction processing. The control portion 71 applies the least squares method on the basis of two coordinate points in FIG. 6B, ((v(k−1), m(k−1)) and (v(k), e(k)), and calculates a coordinate point (v(k+1), e(k+1)) corresponding to the pressure correspondence value v(k+1). The calculated value e(k+1) corresponds to the predicted movement amount calculated by the k+1-th prediction processing. The control portion 71 associates the pressure correspondence value v(k+1) and the calculated predicted movement amount e(k+1) with each other and stores the associated data in the RAM 73. In other words, the control portion 71 calculates the predicted movement amount on the basis of the pressure correspondence value and the movement amount detected by the detection processing before the cutting blade Cs comes into contact with the sheet material 20A.

In FIG. 6B, a line segment L1 (a solid line) is a line segment connecting the plots of the movement amount detected by the detection processing. A line segment L2 (a single dotted line) is a line segment connecting plots of the predicted movement amount calculated by the prediction processing. As shown by the line segments L1 and L2, the plots shown by the line segment L1 (the movement amount detected by the detection processing) are lower values than the plots shown by the line segment L2 (the predicted movement amount calculated by the prediction processing). This is because the predicted movement amount is calculated on the basis of the pressure correspondence value and the movement amount detected by the detection processing before the cutting blade Cs comes into contact with the sheet material 20A. On the other hand, the movement amount detected by the detection processing after the cutting blade Cs comes into contact with the sheet material 20A becomes smaller in accordance with the pressure received from the sheet material 20A in the course of the cutting blade Cs moving downward, and becomes smaller than the predicted movement amount.

As shown in FIG. 9, when the detection processing from the k-th detection processing onward is performed, the control portion 71 performs the prediction processing and calculates the predicted movement amount (step S41). Hereinafter, the detection processing that is triggered by calculating the predicted movement amount by the prediction processing is referred to as "target detection processing." For example, when the k-th prediction processing is performed, the k-th detection processing corresponds to the target detection processing, and when the k+1-th prediction processing is performed, the k+1-th detection processing corresponds to the target detection processing. The pressure correspondence value detected by the target detection processing is referred to as a "target pressure correspondence value." The movement amount detected by the target detection processing is referred to as a "target movement amount."

The control portion 71 reads out and acquires, from the RAM 73, the target pressure correspondence value and the target movement amount detected by the target detection processing. The control portion 71 calculates a difference obtained by subtracting the predicted movement amount calculated by the processing at step S41 from the acquired target movement amount (step S43). The control portion 71 compares the calculated difference with the difference threshold value decided by the processing at step S25 (refer to FIG. 8) (step S45).

In FIG. 6B, a line segment L3 (a double dotted line) is a line segment connecting plots of the difference calculated by the processing at step S43 (refer to FIG. 9). During a period until the cutting blade Cs comes into contact with the release paper 20B (the region T14), the difference transitions over a range smaller than −2 units, while after the cutting blade Cs has come into contact with the release paper 20B (the region T15), the difference becomes larger than −2 units. In other words, an absolute value of the difference obtained by subtracting the predicted movement amount from the target movement amount is relatively small until the cutting blade Cs comes into contact with the release paper 20B, and becomes relatively large after the cutting blade Cs has come into contact with the release paper 20B.

Thus, when the absolute value of the difference calculated by the processing at step S43 (refer to FIG. 9) is smaller than the difference threshold value (no at step S45), the control portion 71 determines that the cutting blade Cs has not reached the release paper 20B in the course of the downward movement of the mounting portion 32. In this case, the control portion 71 identifies, as the position in the up-down direction of the mounting portion 32 at a current time point, the position that is separated downward from the facing position by an amount corresponding to the acquired target movement amount. The control portion 71 reads out and acquires, from the RAM 73, the reference position detected by the processing at step S109 (refer to FIG. 11). On the basis of the position of the mounting portion 32 at the current time point and the reference position, the control portion 71 determines whether or not the cutting blade Cs has penetrated the release paper 20B and come into contact with the platen 3 (step S47). When it is determined that the cutting blade Cs has not come into contact with the platen 3 (no at step S47), the control portion 71 returns the processing to step S41. When the next detection processing is performed, the control portion 71 calculates the predicted movement amount (step S41), and repeats the processing at step S43, step S45, and step S47.

When the absolute value of the difference calculated by the processing at step S43 is equal to or greater than the difference threshold value (yes at step S45), the control portion 71 determines that the cutting blade Cs has reached the release paper 20B in the course of the downward movement of the mounting portion 32, and that the cutting blade Cs has come into contact with the release paper 20B. When the cutting blade Cs comes into contact with the release paper 20B, a state is obtained in which the pressure corresponding to the target pressure correspondence value has been applied to the mounting portion 32 by the pressure applying mechanism 31. The control portion 71 controls the second movement mechanism 33 and stops the downward movement of the mounting portion 32 started by the processing at step S15 (refer to FIG. 8).

The control portion 71 acquires the thickness of the object to be cut 20 detected by the processing at step S23 (refer to FIG. 8) (step S51). The control portion 71 compares the thickness of the object to be cut 20 acquired by the processing at step S51 with a threshold value of the thickness that is prescribed in advance (step S53). When it is determined that the thickness of the object to be cut 20 is equal to or greater than the thickness threshold value (yes at step S53), the control portion 71 decides a first pressure range (refer to FIG. 6B) that is prescribed in advance, as a predetermined range of the pressure correspondence value. The first pressure range prescribes a range that is a range of the pressure correspondence values when the cutting blade Cs has come into contact with the release paper 20B, when the thickness of the object to be cut 20 is equal to or greater than the thickness threshold value. The control portion 71 advances the processing to step S55. On the other hand, when it is determined that the thickness of the object to be cut 20 is smaller than the thickness threshold value (no at step S53), the control portion 71 decides a second pressure range (refer to FIG. 6B) that is prescribed in advance and that is narrower than the first pressure range, as the predetermined range of the pressure correspondence value. The second pressure range prescribes a range that is a range of the pressure correspondence values when the cutting blade Cs has come into contact with the release paper 20B, when the thickness of the object to be cut 20 is smaller than the thickness threshold value. The control portion 71 advances the processing to step S59. In other words, the control portion 71 changes the pressure range in accordance with the thickness of the object to be cut 20.

When the first pressure range is decided as the pressure range (yes at step S53), the control portion 71 determines whether the target pressure correspondence value corresponding to the pressure correspondence value when the cutting blade Cs has come into contact with the release paper 20B is included in the first pressure range (step S55). When it is determined that the target pressure correspondence value is included in the first pressure range (yes at step S55), the control portion 71 decides the target pressure correspondence value as the cutting pressure correspondence value that accords with the pressure applied to the mounting portion 32 for cutting only the sheet material 20A without cutting the release paper 20B, of the object to be cut 20 (step S57). The decided cutting pressure correspondence value corresponds to the pressure correspondence value when the absolute value obtained by subtracting the predicted movement amount from the target movement amount is equal to or greater than the difference threshold value. The control portion 71 advances the processing to step S63.

When it is determined that the target pressure correspondence value is not included in the first pressure range (no at step S55), the control portion 71 advances the processing to step S61. When the target pressure correspondence value is smaller than a lower limit of the first pressure range, the control portion 71 decides the lower limit value of the first pressure range as the cutting pressure correspondence value (step S61). On the other hand, when the target pressure correspondence value is greater than an upper limit of the first pressure range, the control portion 71 decides the upper limit value of the first pressure range as the cutting pressure correspondence value (step S61). Thus, a value that is larger or smaller than an assumed range (the first pressure range) that accords with the thickness of the object to be cut 20 is suppressed from being decided as the cutting pressure correspondence value. The control portion 71 advances the processing to step S63.

On the other hand, when the second pressure range is decided as the pressure range (no at step S53), the control portion 71 determines whether the target pressure correspondence value corresponding to the pressure correspondence value when the cutting blade Cs has come into contact with the release paper 20B is included in the second pressure range (step S59). When it is decided that the target pressure correspondence value is included in the second pressure range (yes at step S59), the control portion 71 decides the target pressure correspondence value as the cutting pressure correspondence value (step S57). When it is decided that the target pressure correspondence value is not included in the second pressure range (no at step S59), the control portion 71 advances the processing to step S61. When the target pressure correspondence value is smaller than a lower limit of the second pressure range, the control portion 71 decides the lower limit value of the second pressure range as the cutting pressure correspondence value (step S61). On the other hand, when the target pressure correspondence value is greater than an upper limit of the second pressure range, the control portion 71 decides the upper limit value of the second pressure range as the cutting pressure correspondence value (step S61). Thus, a value that is larger or smaller than the assumed range (the second pressure range) that accords with the thickness of the object to be cut 20 is suppressed from being decided as the cutting pressure correspondence value. The control portion 71 advances the processing to step S63.

Figure 10:
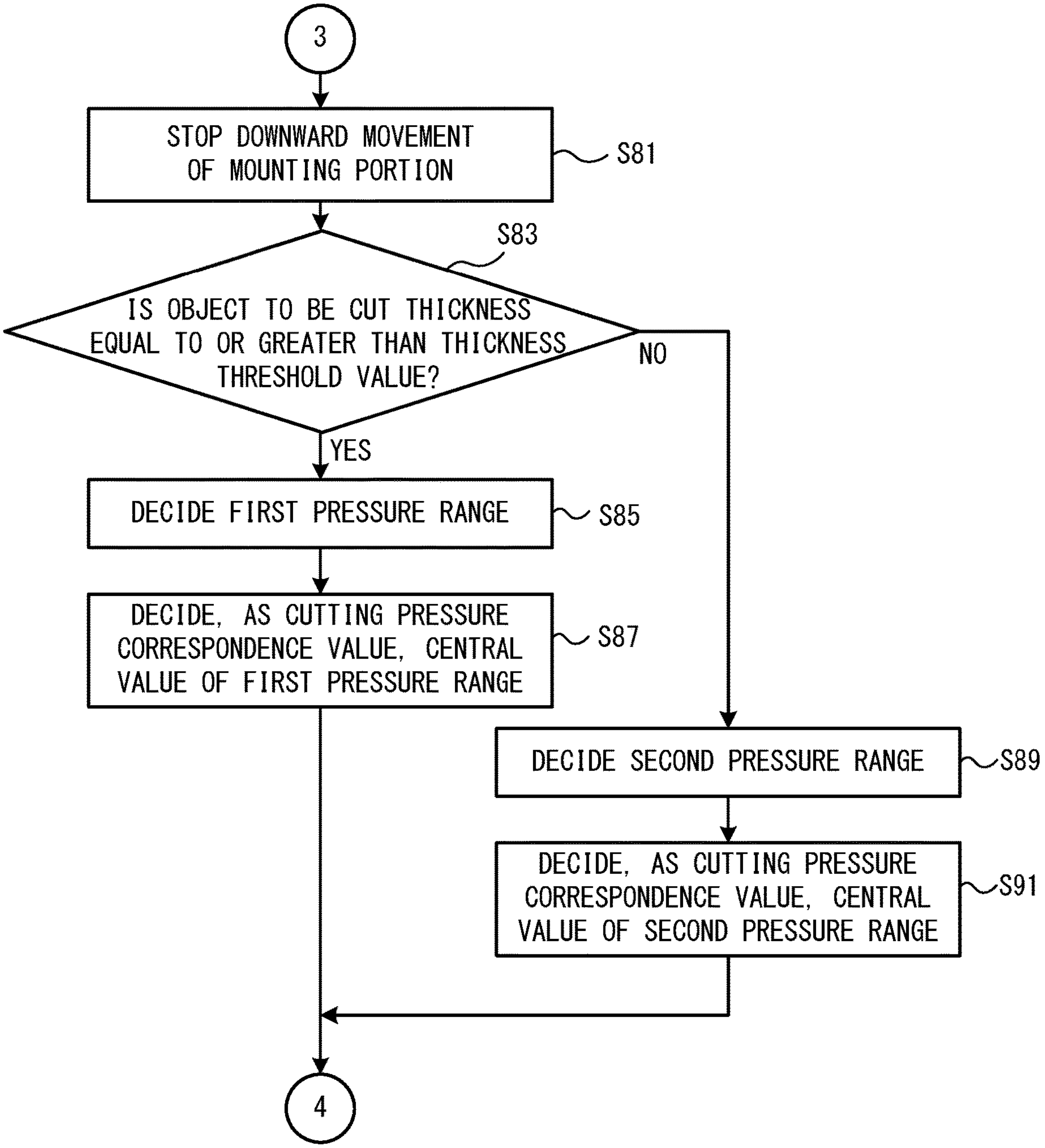
FIG. 10 is a flowchart of the main processing and is a continuation of FIG. 9.

When it is determined that the cutting blade Cs has come into contact with the platen 3 (yes at step S47) in a state in which the absolute value of the difference calculated by the processing at step S43 is smaller than the difference threshold value (no at step S45), the control portion 71 advances the processing to step S81 (refer to FIG. 10). In this case, since this means that the contact between the cutting blade Cs and the release paper 20B that should be detected has not been detected, there is a possibility that the detection of the contact between the cutting blade Cs and the release paper 20B has failed.

As shown in FIG. 10, the control portion 71 stops the downward movement of the mounting portion 32 (step S81) started by the processing at step S15 (refer to FIG. 8). In other words, the control portion 71 moves the mounting portion 32 downward until the cutting blade Cs reaches the reference position detected by the processing at step S109 (refer to FIG. 11), and then stops the mounting portion 32.

The control portion 71 compares the thickness of the object to be cut 20 detected by the processing at step S23 (refer to FIG. 8) with a thickness threshold value (step S83). When it is determined that the thickness of the object to be cut 20 is equal to or greater than the thickness threshold value (yes at step S83), the control portion 71 decides the first pressure range as the predetermined range of the pressure correspondence value (step S85). The control portion 71 decides, as the cutting pressure correspondence value, a central value between the upper limit value and the lower limit value of the first pressure range (step S87). The control portion 71 advances the processing to step S63 (refer to FIG. 9).

When it is determined that the thickness of the object to be cut 20 detected by the processing at step S23 (refer to FIG. 8) is smaller than the thickness threshold value (no at step S83), the control portion 71 decides the second pressure range as the predetermined range of the pressure correspondence value (step S89). The control portion 71 decides, as the cutting pressure correspondence value, a central value between the upper limit value and the lower limit value of the second pressure range (step S91). The control portion 71 advances the processing to step S63 (refer to FIG. 9).

The control portion 71 controls the second movement mechanism 33 and moves the mounting portion 32 upward until the mounting portion 32 is disposed at the upper limit position in the up-down direction.

The control portion 71 reads out and acquires, from the flash memory 74, the cutting data for cutting the pattern specified by the panel operation from the object to be cut 20 (step S63). The control portion 71 controls the conveyance mechanism 8A, the first movement mechanism 8B, and the second movement mechanism 33, on the basis of the control conditions indicated by the acquired cutting data. Further, the control portion 71 controls the second movement mechanism 33 such that the cutting pressure corresponding to the decided cutting pressure correspondence value is applied to the mounting portion 32 by the pressure applying mechanism 31. Then, the control portion 71 uses the cutting blade Cs of the cartridge 4 mounted to the mounting portion 32 to cut the sheet material 20A of the specified pattern from the object to be cut 20 (step S65). The control portion 71 ends the main processing.

Actions and Effects of Embodiment

According to the embodiment, the cutting device 1 decides the cutting pressure on the basis of the pressure correspondence value and the movement amount of the pressure applied to the mounting portion 32 after the cutting blade Cs has come into contact with the release paper 20B of the object to be cut 20. Thus, the cutting device 1 can apply, to the mounting portion 32, the cutting pressure appropriate for the sheet material 20A and the release paper 20B of the object to be cut 20, and as a result, the cutting device 1 can appropriately cut only the sheet material 20A, of the object to be cut 20, using the cutting blade Cs of the cartridge 4 mounted to the mounting portion 32.

As in the embodiment, there is a case in which the object to be cut 20 configured by the sheet material 20A and the release paper 20B covering the adhesive surface formed on the one surface of the sheet material 20A is cut by the cutting blade Cs of the cutting device 1. When the half cut is performed by the cutting device 1, it is preferable that only the sheet material 20A be cut, and that the release paper 20B not be cut. However, the thickness of the sheet material 20A differs depending on the type of the object to be cut 20. Thus, in the cutting device 1, it is preferable that the control be performed to cut only the sheet material 20A and not cut the release paper 20B.

In order to perform the above-described control, the cutting device 1 detects a boundary position between the sheet material 20A and the release paper 20B, on the basis of the pressure correspondence value and the movement amount corresponding to the pressure applied to the mounting portion 32, and decides the cutting pressure for cutting only the sheet material 20A. Thus, the cutting device 1 can cut only the sheet material 20A, of the object to be cut 20, and can appropriately perform the half cut.

The cutting device 1 calculates the predicted movement amount (step S41) on the basis of the pressure correspondence value and the movement amount detected by the detection processing before the cutting blade Cs comes into contact with the sheet material 20A. In this case, using the determination as to whether or not the absolute value of the difference between the predicted movement amount and the target movement amount is equal to or greater than the difference threshold value, the cutting device 1 can accurately detect whether the cutting blade Cs has penetrated the sheet material 20A and reached the release paper 20B. Thus, the cutting device 1 can accurately detect the cutting pressure with which it is possible to cut only the sheet material 20A.

The plots shown by the line segment L1 in FIG. 6B (the movement amount detected by the detection processing) are lower values than the plots shown by the line segment L2 (the predicted movement amount calculated by the prediction processing). Thus, the cutting device 1 compares the absolute value of the difference calculated by subtracting the predicted movement amount from the target movement amount, with the difference threshold value. In this case, the cutting device 1 can identify that the cutting blade Cs has penetrated the sheet material 20A and has reached the release paper 20B that is harder than the sheet material 20A, and can control the cutting pressure such that the cutting blade Cs can cut only the sheet material 20A.

When the contact between the cutting blade Cs and the release paper 20B that should be detected has not been detected (no at step S47), the cutting device 1 stops the downward movement of the mounting portion 32, after moving the mounting portion 32 downward to the position at which the cutting blade Cs reaches the reference position (step S81). In this way, the cutting device 1 can rapidly stop the movement of the mounting portion 32 after the cutting blade Cs has come into contact with the platen 3, and thus, can suppress deterioration of the cutting blade Cs. Further, in this case, the cutting device 1 decides, as the pressure correspondence value corresponding to the cutting pressure, the central value of either the first pressure range or the second pressure range decided depending on the thickness of the object to be cut 20 (step S83 to step S91). In this way, the cutting device 1 can decide the cutting pressure even when the boundary between the sheet material 20A and the release paper 20B in the object to be cut 20 cannot be detected.

The cutting device 1 detects the thickness of the object to be cut 20 (step S23), and decides the difference threshold value in accordance with the detected thickness of the object to be cut 20 (step S25). Thus, the cutting device 1 can decide the appropriate difference threshold value depending on the thickness of the object to be cut 20, and as a result, can accurately decide the pressure correspondence value corresponding to the cutting pressure with which it is possible for the cutting blade Cs to cut only the sheet material 20A. Further, the cutting device 1 decides the difference threshold value such that the value of the difference threshold value is larger the greater the thickness of the object to be cut 20. Thus, the cutting device 1 can accurately decide the pressure correspondence value, even when an error in the difference between the target movement amount and the predicted movement amount becomes larger as a result of the thickness of the object to be cut 20 being greater.

When the target pressure correspondence value is included in the first pressure range or the second pressure range (yes at step S55, yes at step S59), the cutting device 1 decides the target pressure correspondence value as the cutting pressure correspondence value (step S57). On the other hand, when the target pressure correspondence value is greater than the upper limit of the first pressure range or the second pressure range (no at step S55, no at step S59), the control portion 71 decides the upper limit value of the first pressure range or the second pressure range as the cutting pressure correspondence value (step S61). Further, when the target pressure correspondence value is smaller than the lower limit of the first pressure range or the second pressure range (no at step S55, no at step S59), the control portion 71 decides the lower limit value of the first pressure range or the second pressure range as the cutting pressure correspondence value (step S61). As a result, the cutting device 1 can suppress the ineffective pressure correspondence value from being decided as the cutting pressure correspondence value. Further, the cutting device 1 decides either the first pressure range or the second pressure range as the pressure range in accordance with the thickness of the object to be cut 20 (step S53). Thus, since the cutting device 1 can decide the cutting pressure correspondence value using the appropriate pressure range depending on the thickness of the object to be cut 20, the cutting device 1 can appropriately adjust the cutting pressure so as to cut only the sheet material 20A and not cut the release paper 20B.

Modified Example

A modified example of the main processing will be explained with reference to FIG. 14. The modified example differs from the above-described main processing (refer to FIG. 8 to FIG. 11) in that the contact of the cutting blade Cs with the release paper 20B is detected on the basis of a displacement amount of the movement amount. For processing that is the same as that shown in FIG. 8 to FIG. 11, the same reference signs will be assigned in FIG. 14, and an explanation thereof will be omitted.

Figure 14:
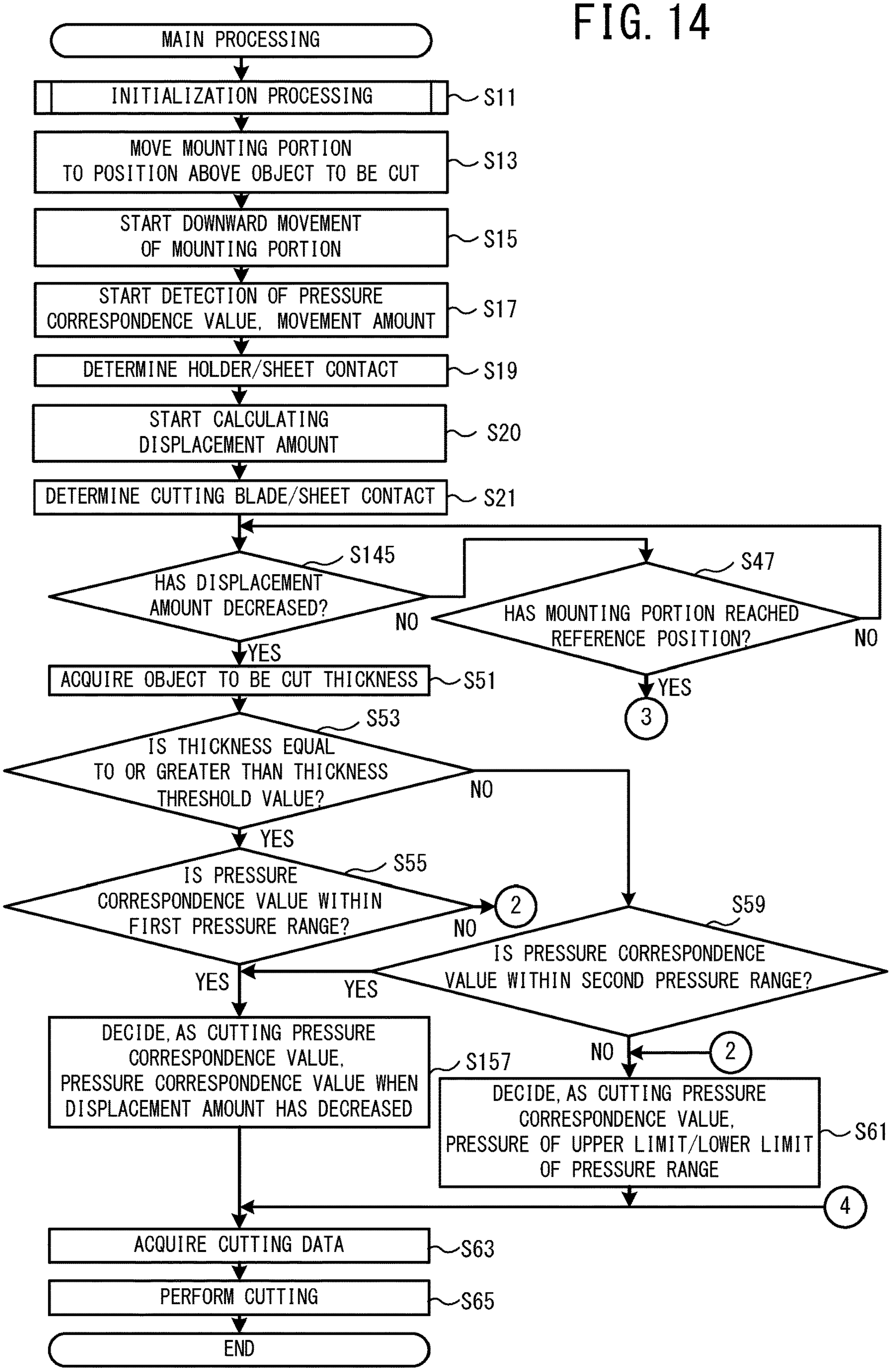
FIG. 14 is a flowchart of the main processing according to a modified example.

As shown in FIG. 14, when it is determined by the processing at step S19 that the holder 42 has come into contact with the sheet material 20A, the control portion 71 starts displacement amount calculation processing (step S20). In the displacement amount calculation processing, on the basis of the detection of the pressure correspondence value and the movement amount by the detection processing that is periodically performed, a displacement amount is calculated between the movement amount detected by the detection processing of the previous cycle and the movement amount detected by the detection processing of a current cycle. The control portion 71 stores the calculated displacement amount in the RAM 73.

After determining, by the processing at step S21, that the cutting blade Cs has come into contact with the sheet material 20A, the control portion 71 advances the processing to step S145. In a similar manner to the above-described embodiment, in the processing at step S21, it is determined that the cutting blade Cs has come into contact with the sheet material 20A on the basis of the movement amount m(k) detected by the k-th detection processing. When the displacement amount calculation processing is performed in accordance with the performing of the detection processing from the k-th detection processing onward, the control portion 71 determines whether the displacement amount calculated by the displacement amount calculation processing of the current cycle has decreased with respect to the displacement amount calculated by the displacement amount calculation processing of the previous cycle (step S145).

As shown in FIG. 7(*a*) to FIG. 7(*f*), the rate of increase (the gradient) of the movement amount with respect to the pressure correspondence value after the cutting blade Cs has come into contact with the release paper 20B is smaller than the rate of increase (the gradient) of the movement amount with respect to the pressure correspondence value during a period from when the cutting blade Cs comes into contact with the sheet material 20A to when the cutting blade Cs comes into contact with the release paper 20B. In other words, in the period after the cutting blade Cs has come into contact with the sheet material 20A, the displacement amount after the cutting blade Cs has come into contact with the release paper 20B decreases with respect to the displacement amount before the cutting blade Cs comes into contact with the release paper 20B.

As shown in FIG. 14, when the displacement amount has not decreased (no at step S145), the control portion 71 determines that the cutting blade Cs has not reached the release paper 20B in the course of the downward movement of the mounting portion 32. In this case, the control portion 71 advances the processing to step S47. On the other hand, when the displacement amount has decreased (yes at step S145), the control portion 71 determines that the cutting blade Cs has reached the release paper 20B in the course of the downward movement of the mounting portion 32, and that the cutting blade Cs has come into contact with the release paper 20B. In this case, the control portion 71 advances the processing to step S51.

When the first pressure range is decided as the pressure range, in accordance with the thickness of the object to be cut 20 detected by the processing at step S51 (yes at step S53), the control portion 71 determines whether the target pressure correspondence value corresponding to the pressure correspondence value when the cutting blade Cs has come into contact with the release paper 20B is included in the first pressure range (step S55). When it is determined that the target pressure correspondence value is included in the first pressure range (yes at step S55), the control portion 71 decides the target pressure correspondence value as the cutting pressure correspondence value (step S157). Further, when the second pressure range is decided as the pressure range, in accordance with the thickness of the sheet material 20A (no at step S53), the control portion 71 determines whether the target pressure correspondence value is included in the second pressure range (step S59). When it is determined that the target pressure correspondence value is included in the second pressure range (yes at step S59), the control portion 71 decides the target pressure correspondence value as the cutting pressure correspondence value (step S157). The decided cutting pressure correspondence value corresponds to the pressure correspondence value when the displacement amount has decreased.

The control portion 71 reads out the cutting data from the flash memory 74 (step S63), and controls the conveyance mechanism 8A, the first movement mechanism 8B, and the second movement mechanism 33. Further, the control portion 71 controls the second movement mechanism 33 such that the cutting pressure corresponding to the decided cutting pressure correspondence value is applied to the mounting portion 32 by the pressure applying mechanism 31. Thus, the control portion 71 cuts the object to be cut 20 using the cutting blade Cs of the cartridge 4 mounted to the mounting portion 32 (step S65). As a result, the cutting device 1 can cut only the sheet material 20A without cutting the release paper 20B, of the object to be cut 20 (can perform the half cut).

Other Modified Examples

The present disclosure is not limited to the above-described embodiment and various modifications are possible. The cartridge 4 need not necessarily be provided with the holder 42, and the cutting blade Cs may be constantly exposed. The method for detecting that the cutting blade Cs has come into contact with the sheet material 20A of the object to be cut 20, and the method for detecting that the cutting blade Cs has reached the release paper 20B of the object to be cut 20 are not limited to the above-described methods. For example, the cutting device 1 may be provided with a contact sensor that can detect that the holder 42 or the cutting blade Cs has come into contact with the sheet material 20A. The cutting device 1 may determine whether the holder 42 or the cutting blade Cs has come into contact with the sheet material 20A on the basis of a detection result by the contact sensor.

The cutting device 1 may be used in a state in which a plate-shaped holding member is placed on the platen 3. In this case, the object to be cut 20 may be cut by the cutting device 1 in a state in which the object to be cut 20 is held on the upper surface of the holding member. An object to be cut different from the object to be cut 20 in which the sheet material 20A and the release paper 20B are laminated may be used. For example, the adhesive need not necessarily be applied to the sheet material 20A of the object to be cut 20. The object to be cut 20 may be configured by the sheet material 20A alone, and need not necessarily include the release paper 20B. Further, the object to be cut 20 may include a surface that attracts the release paper 20B, of the sheet material 20A, and another layer (a protective layer or the like, for example) on the opposite side to that surface.

The cutting device 1 calculates the predicted movement amount e(k) corresponding to the pressure correspondence value v(k) detected after the cutting blade Cs has come into contact with the sheet material 20A, on the basis of the pressure correspondence values v(k−2), v(k−1) and the movement amounts m(k−2), m(k−1) detected before the cutting blade Cs comes into contact with the sheet material 20A (step S41). However, the cutting device 1 may calculate the predicted movement amount e(k+2) on the basis of the pressure correspondence values v(k), v(k+1) and the movement amounts m(k), m(k+1) detected by the detection processing after the cutting blade Cs has come into contact with the sheet material 20A. Further, the cutting device 1 may calculate the predicted movement amount e(k−1) on the basis of the pressure correspondence values v(k−3), v(k−2) and the movement amounts m(k−3), m(k−2) detected by the detection processing before the cutting blade Cs comes into contact with the sheet material 20A. In these cases, the movement amount detected by the detection processing may be larger than the predicted movement amount calculated by the prediction processing. A sample number when calculating the predicted movement amount is not limited to two, as in the above-described embodiment, and may be three or more. The technique used when calculating the predicted movement amount e(k) is not limited to the two squares method, and the predicted movement amount may be calculated by applying another known approximating technique.

After determining that the cutting blade Cs has come into contact with the platen 3 (no at step S47), the cutting device 1 stops the downward movement of the mounting portion 32 (step S81). However, the cutting device 1 may stop the downward movement of the mounting portion 32 before the cutting blade Cs comes into contact with the platen 3 (immediately before the cutting blade Cs comes into contact with the platen 3, for example) (step S81). More specifically, the cutting device 1 may stop the downward movement of the mounting portion 32 when the mounting portion 32 has moved downward to a position above the reference position by an amount corresponding to a predetermined distance. Further, the cutting device 1 need not necessarily decide the central value of either the first pressure range or the second pressure range as the cutting pressure correspondence value. For example, the cutting device 1 may decide a value of either the first pressure range or the second pressure range as the cutting pressure correspondence value. Further, instead of the above, the cutting device 1 may display, on the LCD 51, a screen for notifying the user that the contact between the cutting blade Cs and the release paper 20B that should have been detected has not been detected.

The cutting device 1 decides the difference threshold value in accordance with the detected thickness of the object to be cut 20 (step S25). However, the cutting device 1 may decide the difference threshold value in accordance with the thickness of the sheet material 20A. For example, the user may use the panel operation to input, to the cutting device 1, the thickness of the sheet material 20A. The cutting device 1 may decide the difference threshold value in accordance with the input thickness of the sheet material 20A. The cutting device 1 may always use a constant difference threshold value, without changing the difference threshold value in accordance with the thickness of the object to be cut 20 or the sheet material 20A.

When the target pressure correspondence value is greater than the upper limit of the first pressure range or the second pressure range (no at step S55, no at step S59), the control portion 71 may decide, as the cutting pressure correspondence value, a value close to the upper limit value of the first pressure range or the second pressure range (step S61). Further, when the target pressure correspondence value is smaller than the lower limit of the first pressure range or the second pressure range (no at step S55, no at step S59), the control portion 71 may decide, as the cutting pressure correspondence value, a value close to the lower limit value of the first pressure range or the second pressure range (step S61). The cutting device 1 may always use a constant pressure range, regardless of the thickness of the sheet material 20A.

The control portion 71 may first perform the detection processing while moving the mounting portion 32 downward until the mounting portion 32 reaches the reference position, and may repeatedly store the pressure correspondence value and the movement amount in association with each other in the RAM 73. After the mounting portion 32 has reached the reference position, the control portion 71 may perform step S19 to step S25 (refer to FIG. 8) and step S41 to step S61 (refer to FIG. 9) on the basis of the pressure correspondence value and the movement amount stored in the RAM 73, and may decide the cutting pressure correspondence value. In other words, after moving the mounting portion 32 to the reference position, the control portion 71 may calculate the predicted movement amount and the difference (step S41, step S43), and may decide the cutting pressure correspondence value on the basis of the difference.

For example, the control portion 71 may detect, as the thickness of the sheet material 20A, a difference between the movement amount detected by the detection processing when it is determined, in the processing at step S51, that the cutting blade Cs has come into contact with the sheet material 20A (refer to FIG. 7(*c*)) and the movement amount detected by the detection processing when it is determined, in the processing at step S45, that the cutting blade Cs has come into contact with the release paper 20B (refer to FIG. 7(*e*)). The control portion 71 may compare the detected thickness of the sheet material 20A and the thickness threshold value prescribed in advance (step S53), and may set the first pressure range or the second pressure range.

In the processing at step S23, the control portion 71 detects, as the thickness of the object to be cut 20, the difference between the reference position and the control position. However, the control portion 71 may detect, as the thickness of the object to be cut 20, the thickness of the object to be cut 20 input by the user by the panel operation, for example. Further, the cutting device 1 may associate information identifying the type of the object to be cut 20 with the thickness for each type of the object to be cut 20, and may store the associated information in the flash memory 74. The control portion 71 may acquire the information identifying the type of the object to be cut 20 input by the user by the panel operation. The control portion 71 may read out, from the flash memory 74, the thickness associated with the acquired type of the object to be cut 20, and may detect the read out thickness as the thickness of the object to be cut 20.

What is claimed is:

1. A cutting device comprising:

a placement member, an object to be cut being placeable on the placement member;

a mounting portion, a cutting blade being mountable to the mounting portion;

a first movement mechanism configured to relatively move the object to be cut placed on the placement member, and the mounting portion in a first direction and a second direction, the second direction being opposite to the first direction;

a second movement mechanism configured to move the mounting portion in a third direction causing the mounting portion to move closer to the placement member, and a fourth direction causing the mounting portion to move away from the placement member, the third direction and the fourth direction intersecting the first direction and the second direction;

a pressure applying mechanism configured to apply pressure to the mounting portion in the third direction, in accordance with a movement of the mounting portion by the second movement mechanism;

a control portion configured to control the first movement mechanism and the second movement mechanism; and a memory having computer-readable instructions stored thereon that when executed by the control portion, instruct the control portion to perform processes comprising:

moving the mounting portion, by controlling the first movement mechanism, to a facing position at which the cutting blade faces the object to be cut and the cutting blade is separated, in the fourth direction, from the object to be cut;

moving the mounting portion in the third direction from the facing position by controlling the second movement mechanism;

detecting, in a course of the mounting portion moving in the third direction, a pressure correspondence value corresponding to the pressure in the third direction applied to the mounting portion by the pressure applying mechanism, and a movement amount of the mounting portion in the third direction;

deciding a cutting pressure correspondence value, on a basis of the pressure correspondence value and the movement amount after the cutting blade has come into contact with the object to be cut, of the detected pressure correspondence value and the detected movement amount, the cutting pressure correspondence value being the pressure correspondence value corresponding to a cutting pressure applied to the mounting portion by the pressure applying mechanism when cutting the object to be cut using the cutting blade;

acquiring cutting data for cutting a pattern from the object to be cut; and controlling the first movement mechanism and the second movement mechanism in accordance with the acquired cutting data, applying the cutting pressure corresponding to the decided cutting pressure correspondence value to the mounting portion, using the pressure applying mechanism, and cutting the object to be cut, using the cutting blade mounted to the mounting portion.

2. The cutting device according to claim 1, wherein the detecting the pressure correspondence value and the movement amount includes detecting a first pressure correspondence value that is the pressure correspondence value corresponding to a first pressure, and a first movement amount that is the movement amount of the mounting portion when the first pressure is applied to the mounting portion, a second pressure correspondence value that is the pressure correspondence value corresponding to a second pressure, and a second movement amount that is the movement amount of the mounting portion when the second pressure is applied to the mounting portion, and a third pressure correspondence value that is the pressure correspondence value corresponding to a third pressure, and a third movement amount that is the movement amount of the mounting portion when the third pressure is applied to the mounting portion, the second pressure being larger than the first pressure, and the third pressure being larger than the second pressure, and the deciding the cutting pressure correspondence value includes calculating, on a basis of a change amount of the pressure correspondence value from the first pressure correspondence value to the second pressure correspondence value, and a change amount from the first movement amount to the second movement amount, a predicted value of the movement amount of the mounting portion when the third pressure is applied, and deciding the cutting pressure correspondence value on a basis of the third pressure correspondence value when a difference between the third movement amount and the predicted value is equal to or greater than a predetermined difference threshold value.

3. The cutting device according to claim 2, wherein the predicted value is calculated on a basis of the detected pressure correspondence value and the detected movement amount before the cutting blade comes into contact with the object to be cut.

4. The cutting device according to claim 2, wherein the deciding the cutting pressure correspondence value includes deciding the cutting pressure correspondence value on the basis of the third pressure correspondence value when the difference, when the third movement amount is smaller than the predicted value, is equal to or greater than the difference threshold value.

5. The cutting device according to claim 2, wherein the computer-readable instructions stored in the memory further instruct the control portion to perform processes comprising:

moving the mounting portion, by controlling the first movement mechanism, to a position that is a position at which the cutting blade faces the placement member and the cutting blade does not face the object to be cut;

moving the mounting portion in the third direction, by controlling the second movement mechanism, after moving the mounting portion to the position that is the position at which the cutting blade faces the placement member and the cutting blade does not face the object to be cut; and detecting, as a reference position, a position in the third direction of the mounting portion when the cutting blade has come into contact with the placement member, and the moving the mounting portion in the third direction from the facing position includes moving the mounting portion in the third direction to a specific position, on a basis of the detected reference position.

6. The cutting device according to claim 5, wherein the deciding the cutting pressure correspondence value includes deciding the cutting pressure correspondence value on a basis of a thickness of the object to be cut detected on the basis of the detected reference position, when the mounting portion has moved to the detected reference position, and when the difference between the third movement amount and the predicted value is not equal to or greater than the difference threshold value.

7. The cutting device according to claim 2, wherein the computer-readable instructions stored in the memory further instruct the control portion to perform processes comprising:

detecting a thickness of the object to be cut; and deciding the difference threshold value in accordance with the detected thickness of the object to be cut, and the deciding the cutting pressure correspondence value includes deciding the cutting pressure correspondence value on the basis of the third pressure correspondence value when the difference between the third movement amount and the predicted value is equal to or greater than the decided difference threshold value.

8. The cutting device according to claim 7, wherein the deciding the difference threshold value in accordance with the detected thickness of the object to be cut includes deciding the difference threshold value to be a larger value the greater the thickness of the object to be cut.

9. The cutting device according to claim 2, wherein the deciding the cutting pressure correspondence value includes determining whether the third pressure correspondence value is within a predetermined pressure range, deciding the third pressure correspondence value as the cutting pressure correspondence value when the third pressure correspondence value is within the predetermined pressure range, and deciding, as the cutting pressure correspondence value, the pressure correspondence value corresponding to any one of pressures within the pressure range in place of the third pressure correspondence value, when the third pressure correspondence value is outside the predetermined pressure range.

10. The cutting device according to claim 9, wherein the deciding the cutting pressure correspondence value includes deciding, as the cutting pressure correspondence value, the pressure correspondence value corresponding to a lower limit of the pressure range in place of the third pressure correspondence value, when the third pressure correspondence value is smaller than the lower limit of the pressure range, and deciding, as the cutting pressure correspondence value, the pressure correspondence value corresponding to an upper limit of the pressure range in place of the third pressure correspondence value, when the third pressure correspondence value is larger than the upper limit of the pressure range.

11. The cutting device according to claim 9, wherein the computer-readable instructions stored in the memory further instruct the control portion perform a process comprising:

detecting a thickness of the object to be cut, and the deciding the cutting pressure correspondence value includes setting the pressure range in accordance with the detected thickness of the object to be cut, and determining whether the third pressure correspondence value is within the set pressure range.

12. The cutting device according to claim 1, wherein the second movement mechanism includes a motor rotated by input of a pulse, the second movement mechanism moving the mounting portion in one of the third direction and the fourth direction by a rotation of the motor, the moving the mounting portion in the third direction from the facing position, by controlling the second movement mechanism, includes moving the mounting portion in the third direction when the pulse is input to the motor, and the deciding the cutting pressure correspondence value includes deciding the cutting pressure correspondence value on a basis of the pressure correspondence value detected when a first displacement amount has decreased, the first displacement amount being a displacement amount of the movement amount of the mounting portion when a predetermined number of pulses is input to the motor after the cutting blade has come into contact with the object to be cut.

* * * * *